United States Patent [19]

Powell et al.

[11] Patent Number: 4,958,306

[45] Date of Patent: Sep. 18, 1990

[54] PAVEMENT INSPECTION APPARATUS

[75] Inventors: Joseph P. Powell, Veradale; Donald L. Bender, Spokane; Sam C. Saunders, Pullman; Larry W. Purnell; Anwar S. Khattak, both of Spokane, all of Wash.

[73] Assignee: Pacific northwest research & Development, Inc., Spokane, Wash.

[21] Appl. No.: 141,248

[22] Filed: Jan. 6, 1988
(Under 37 CFR 1.47)

[51] Int. Cl.$^5$ .................. G01B 11/00; G01N 3/40
[52] U.S. Cl. ................................. 364/550; 73/146
[58] Field of Search ............... 364/550; 358/108, 107; 73/146; 382/10, 1

[56]  References Cited
U.S. PATENT DOCUMENTS

| Re. 27,875 | 1/1974 | Swift | 73/146 |
|---|---|---|---|
| 3,151,235 | 9/1964 | Greensheilds | 73/146 |
| 3,431,776 | 3/1969 | Hughes | 73/146 |
| 3,459,038 | 8/1969 | Swift | 73/146 |
| 3,572,111 | 3/1971 | Johnson | 73/146 |
| 3,888,108 | 6/1975 | Brands | 73/146 |
| 3,888,118 | 6/1975 | Nims | 73/146 |
| 3,893,330 | 7/1975 | Shute et al. | 73/146 |
| 3,983,746 | 10/1976 | Phillips et al. | 73/105 |
| 4,052,712 | 10/1977 | Ohama et al. | 346/107 R |
| 4,409,823 | 10/1983 | Gressin | 73/146 |
| 4,422,322 | 12/1983 | Spangler | 73/146 |
| 4,456,829 | 6/1984 | Fohey | 250/560 |
| 4,539,561 | 9/1985 | Wolff | 340/675 |
| 4,653,316 | 3/1987 | Fukuhara | 73/146 |
| 4,674,327 | 6/1987 | Swindall et al. | 73/146 |
| 4,700,223 | 10/1987 | Shontaro et al. | 388/93 |
| 4,708,472 | 11/1987 | Hofmann | 356/2 |
| 4,781,058 | 11/1988 | Arnberg | 73/84 |
| 4,786,815 | 11/1988 | Walker | 250/560 |

OTHER PUBLICATIONS

The Earth Technology Corporation, "Automated Pavement Condition Evaluation".
Highway Products International, Inc., "ARAN" Brochure.

Primary Examiner—Parshotam S. Lall
Assistant Examiner—S. A. Melnick
Attorney, Agent, or Firm—Wells, St.John & Roberts

[57] ABSTRACT

A pavement inspection apparatus 10 is described for inspecting the condition of a full lane of pavement using a vehicle capable of traveling along the lane at normal traffic speeds, such as 55 miles per hour. The apparatus is capable of determing the elevational profile of the pavement and the size and shapes of surface distress features such as longitudinal cracks, transverse cracks, aligator cracks, design cracks, potholes and rutting. The apparatus 10 has two video array cameras 36 and 40 that project downward onto the pavement with overlapping fields of view for generating X-Y pixel data representing the intensities of reflected light from a full lane width of pavement as the vehicle moves over the pavement. The cameras 36 and 40 are mounted at acute angles with respect to each other to enable an elevational profile to be developed for the pavement from correlated pixel data from the two cameras. The apparatus 10 includes distress feature analysis electronics for determining the size, shape and location of surface distress features and evaluates such features against preset values to determine the severity of the determined features. Additionally, the apparatus 10 has video array cameras 192 and 196 for determining the deflection of the pavement in response to the movement of a known wheel weight over the pavement.

47 Claims, 16 Drawing Sheets

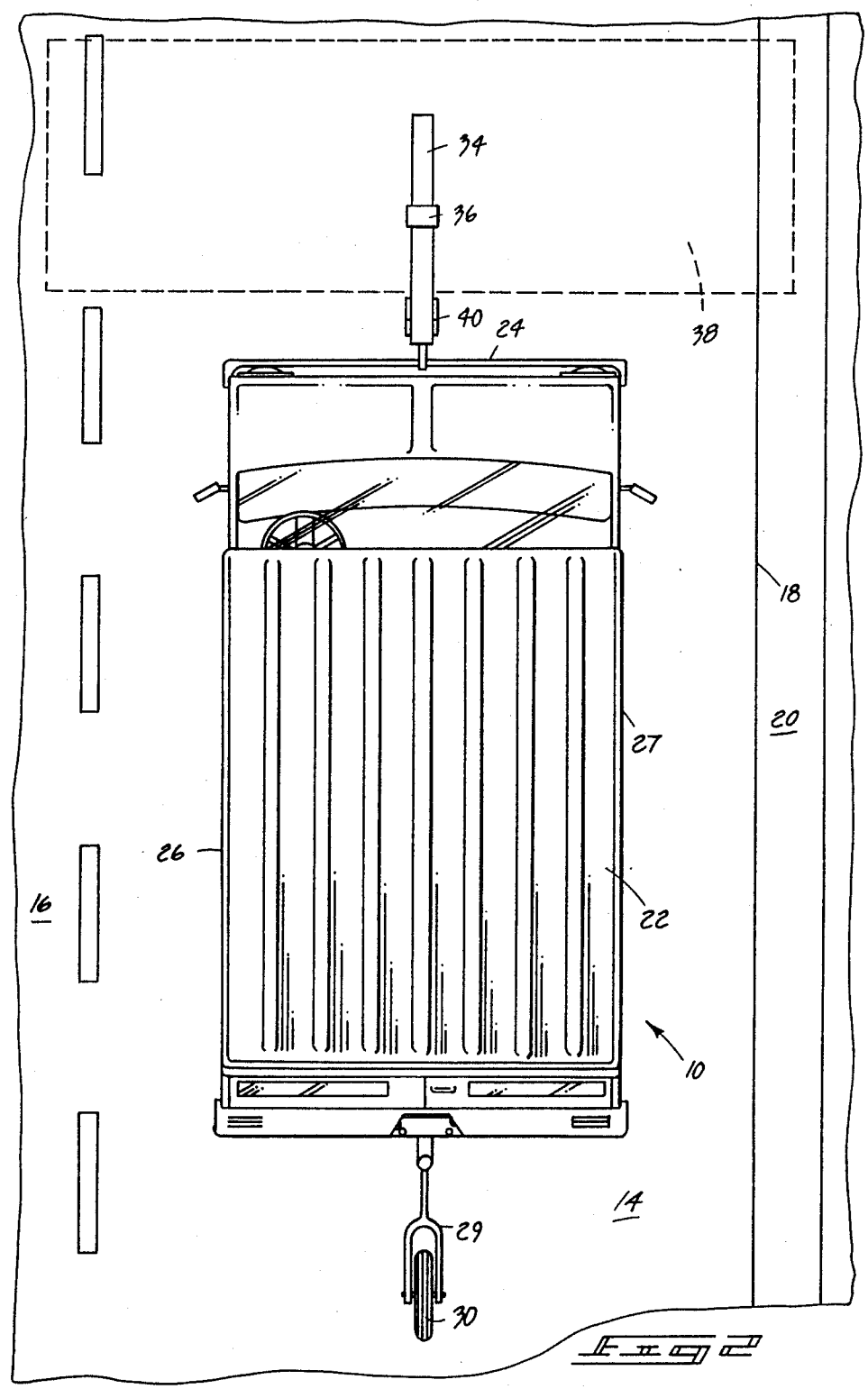

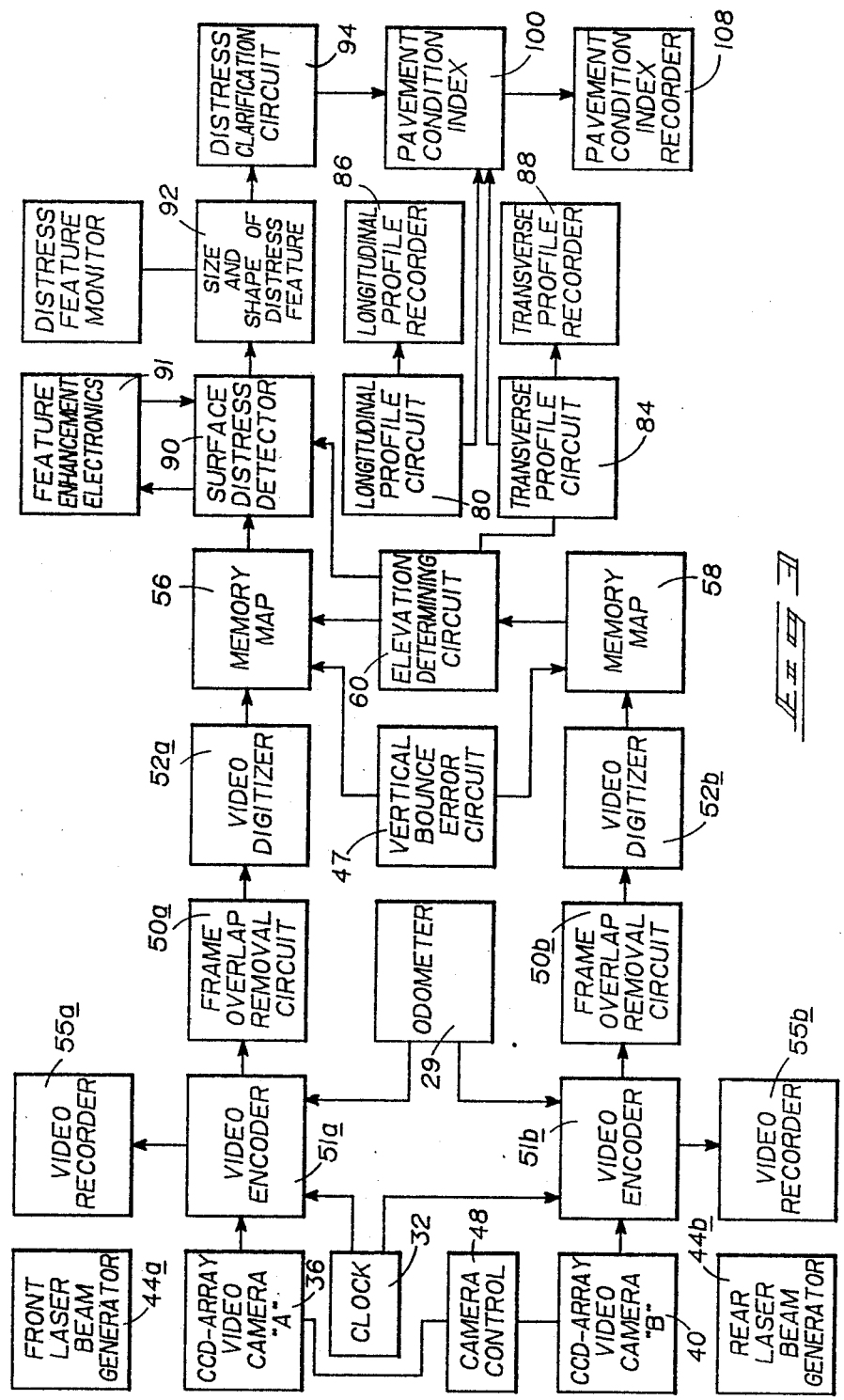

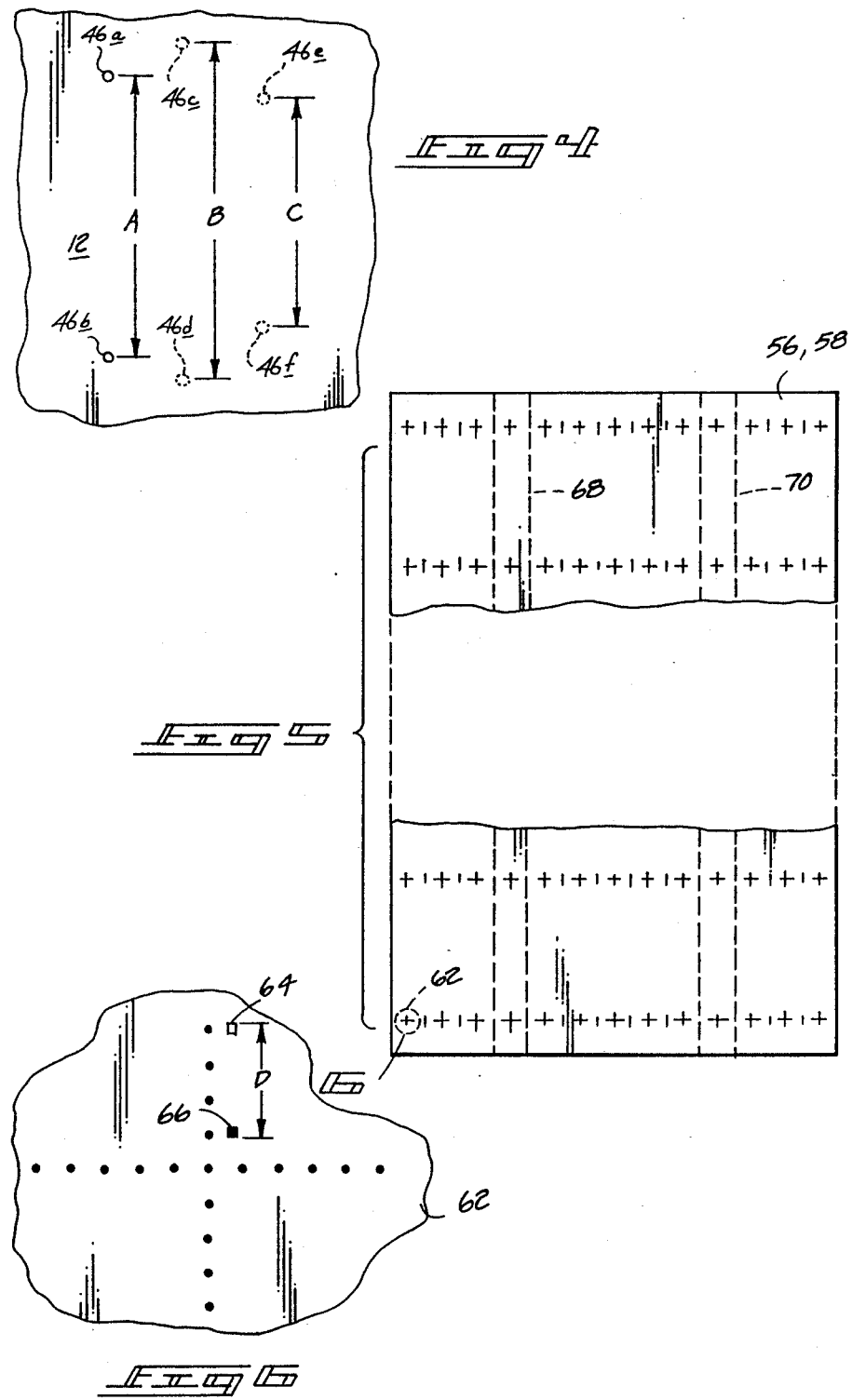

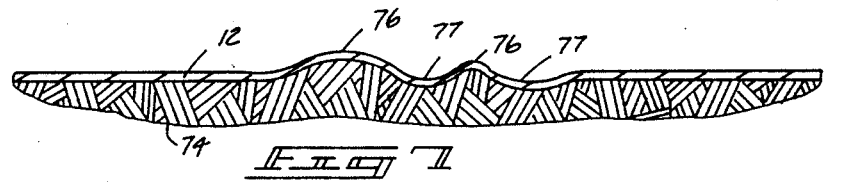
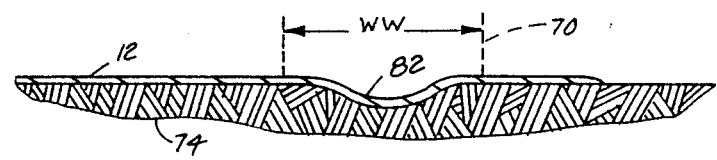
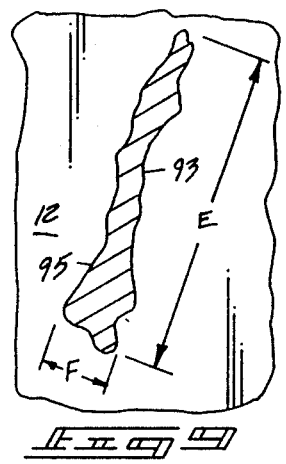
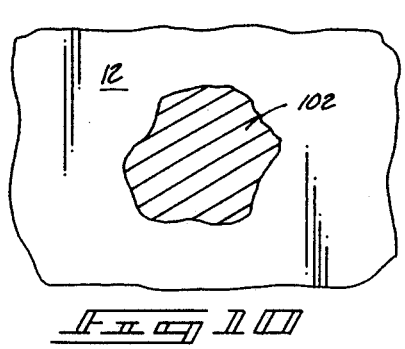
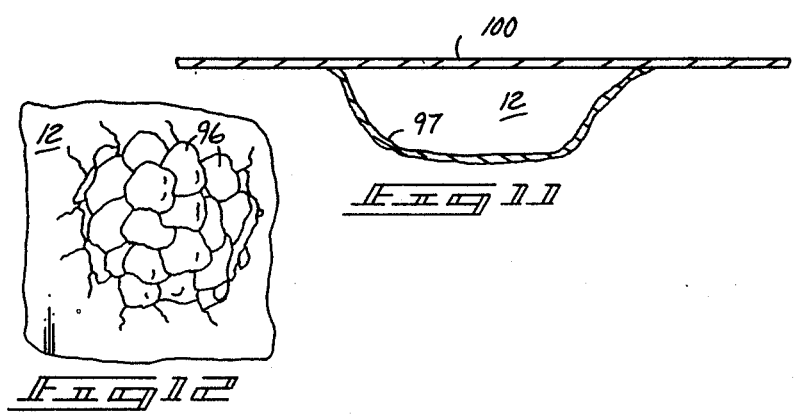
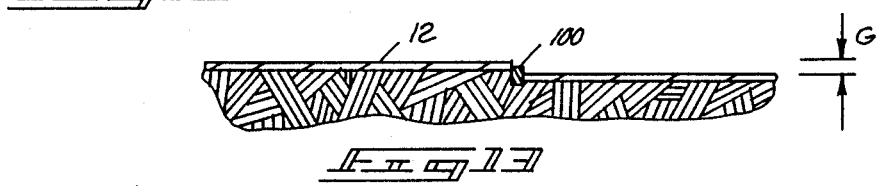

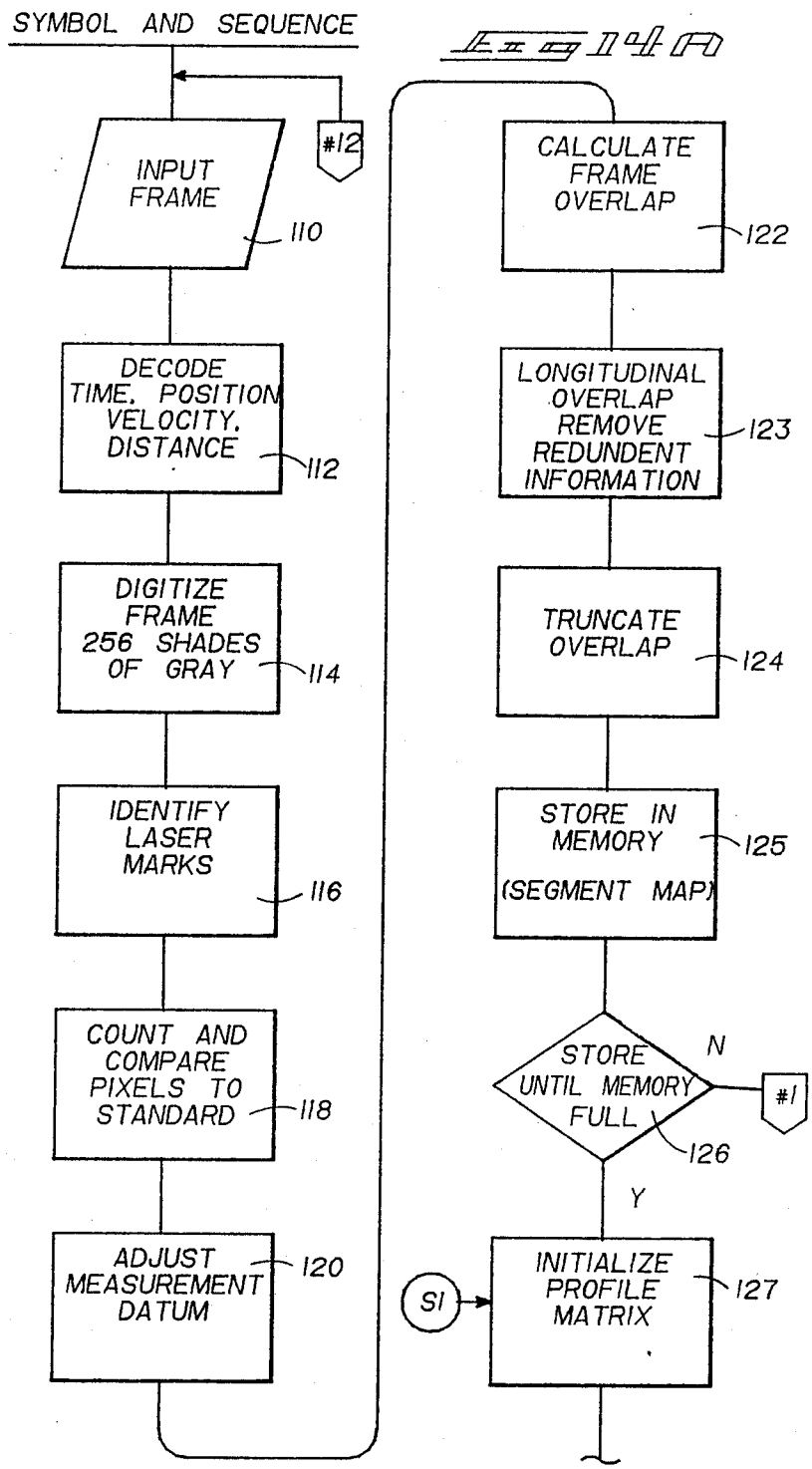

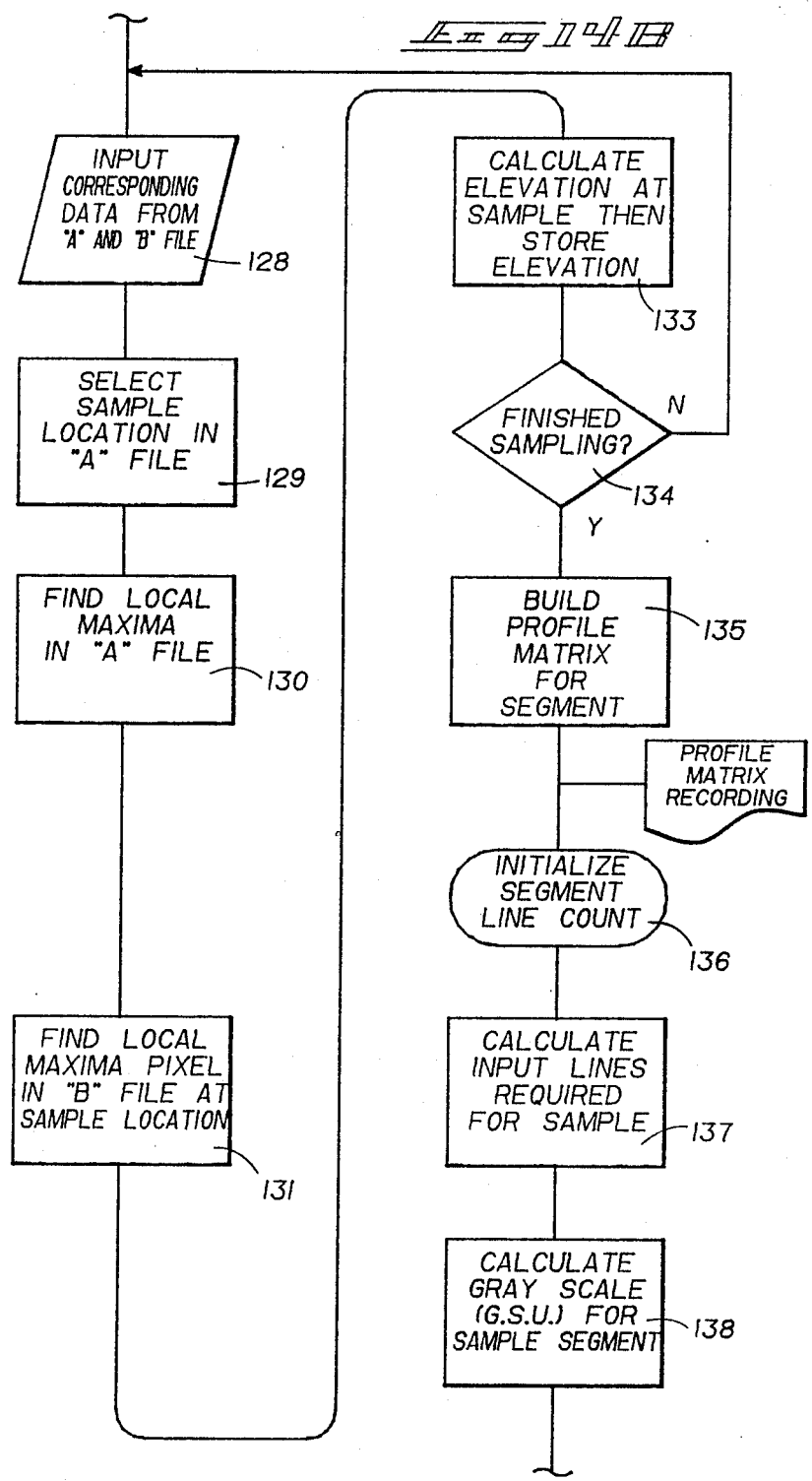

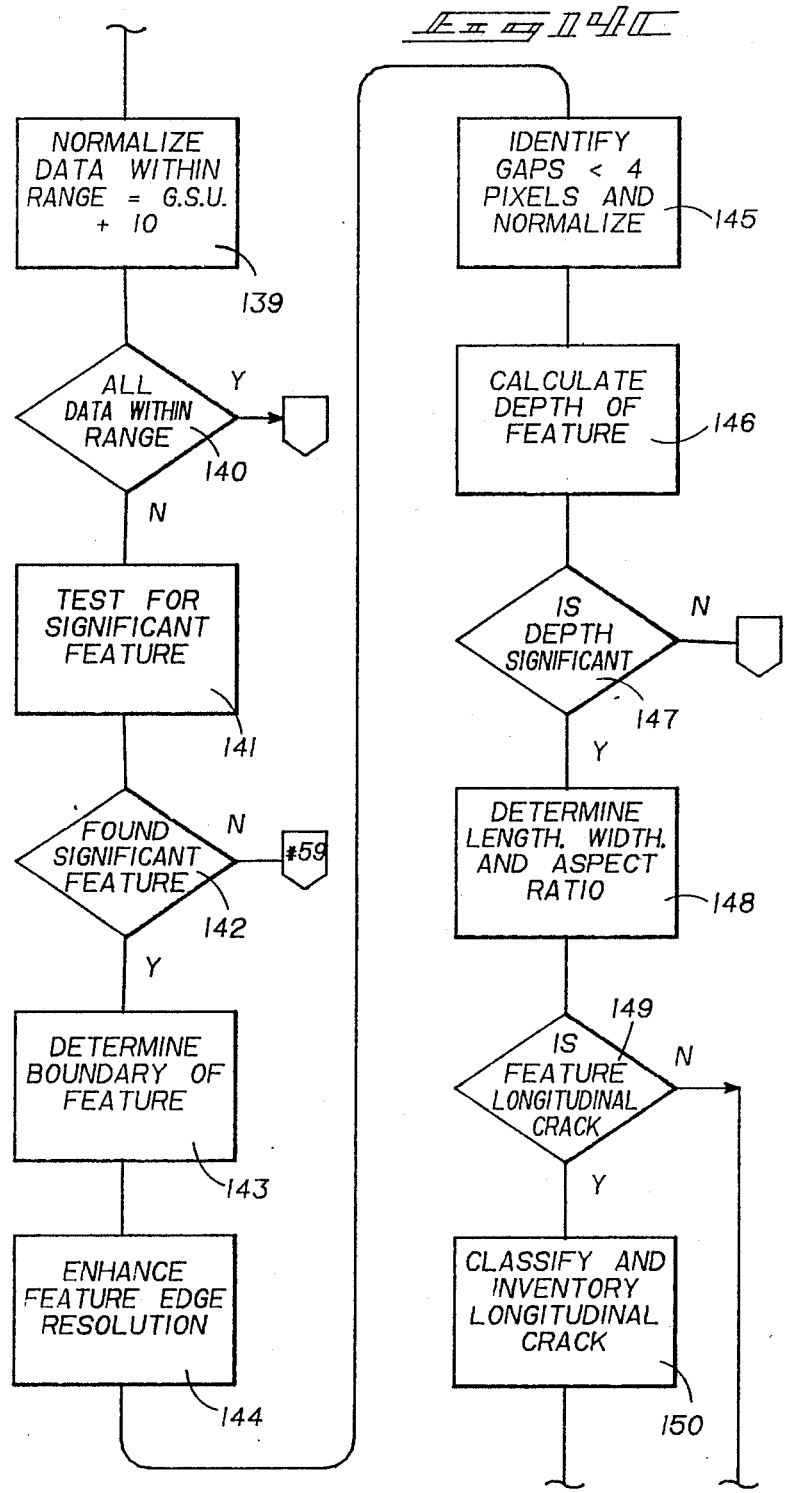

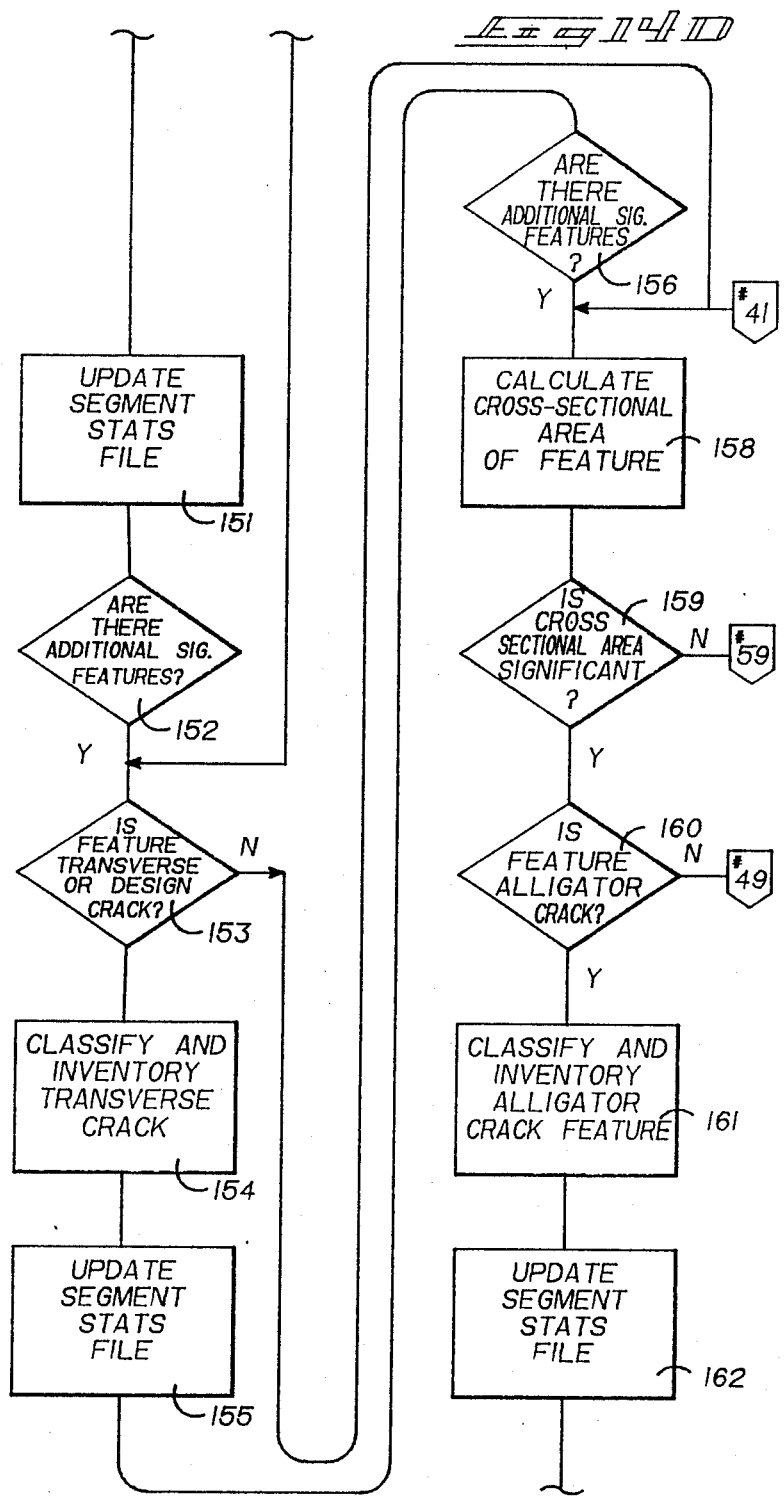

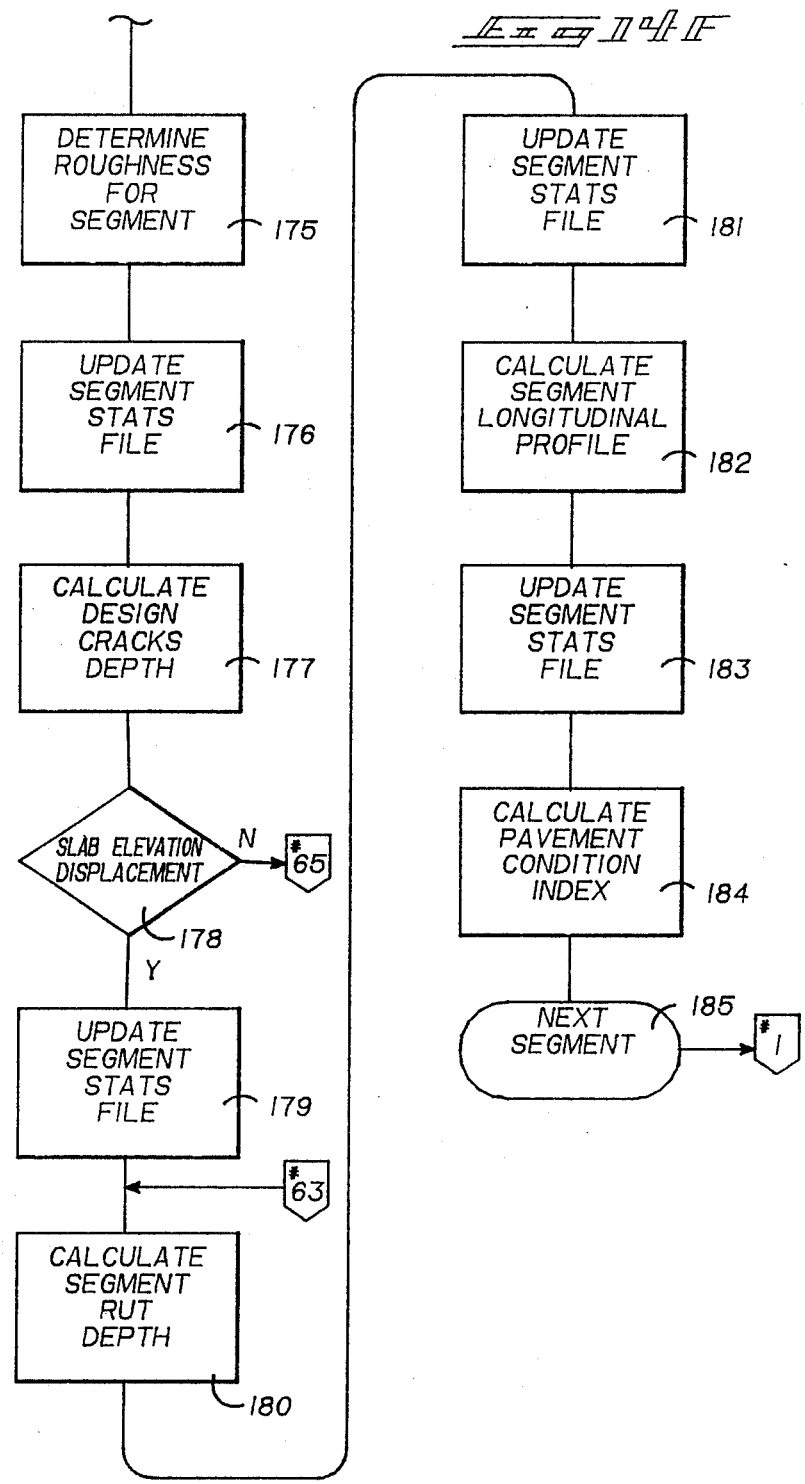

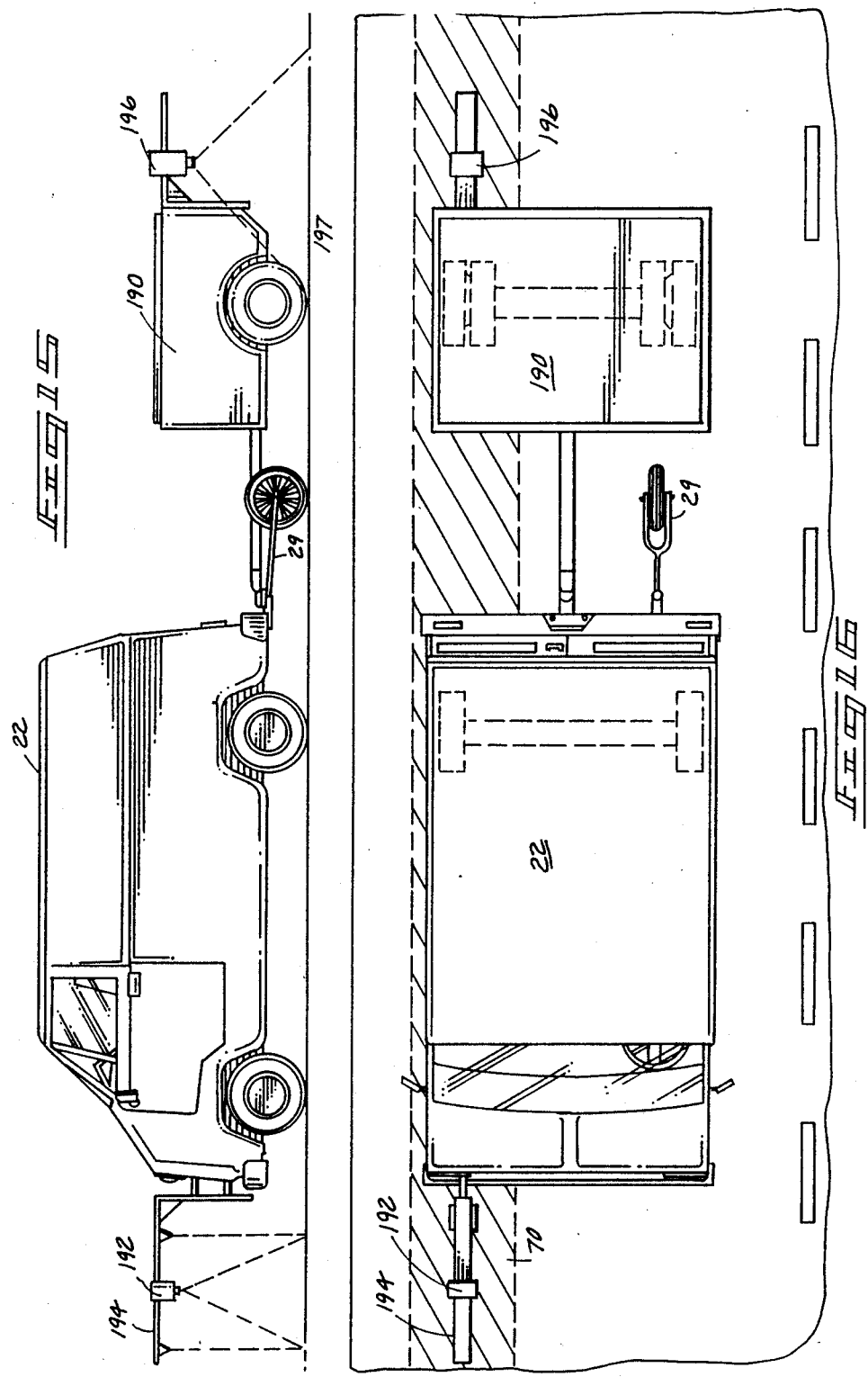

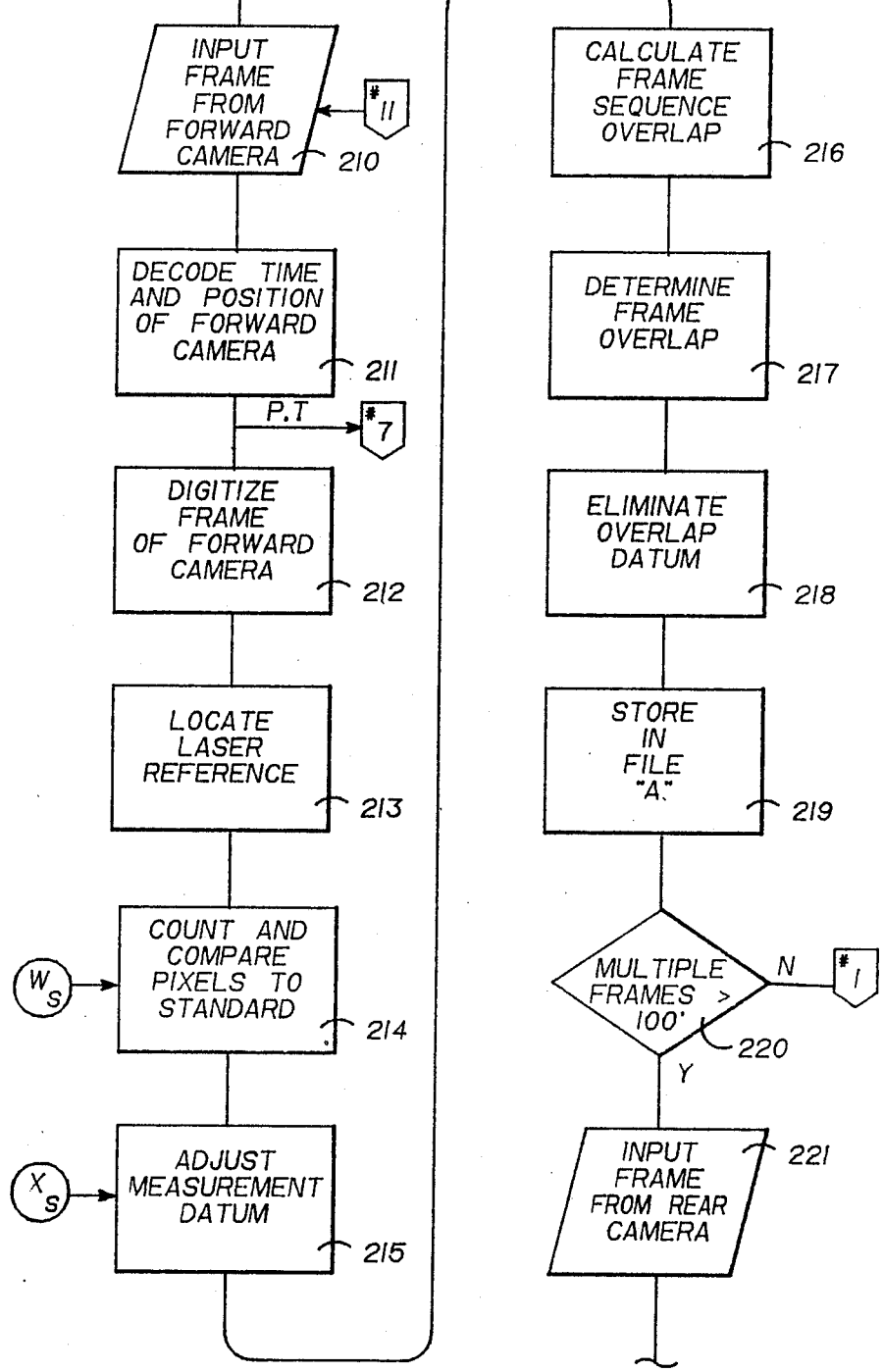

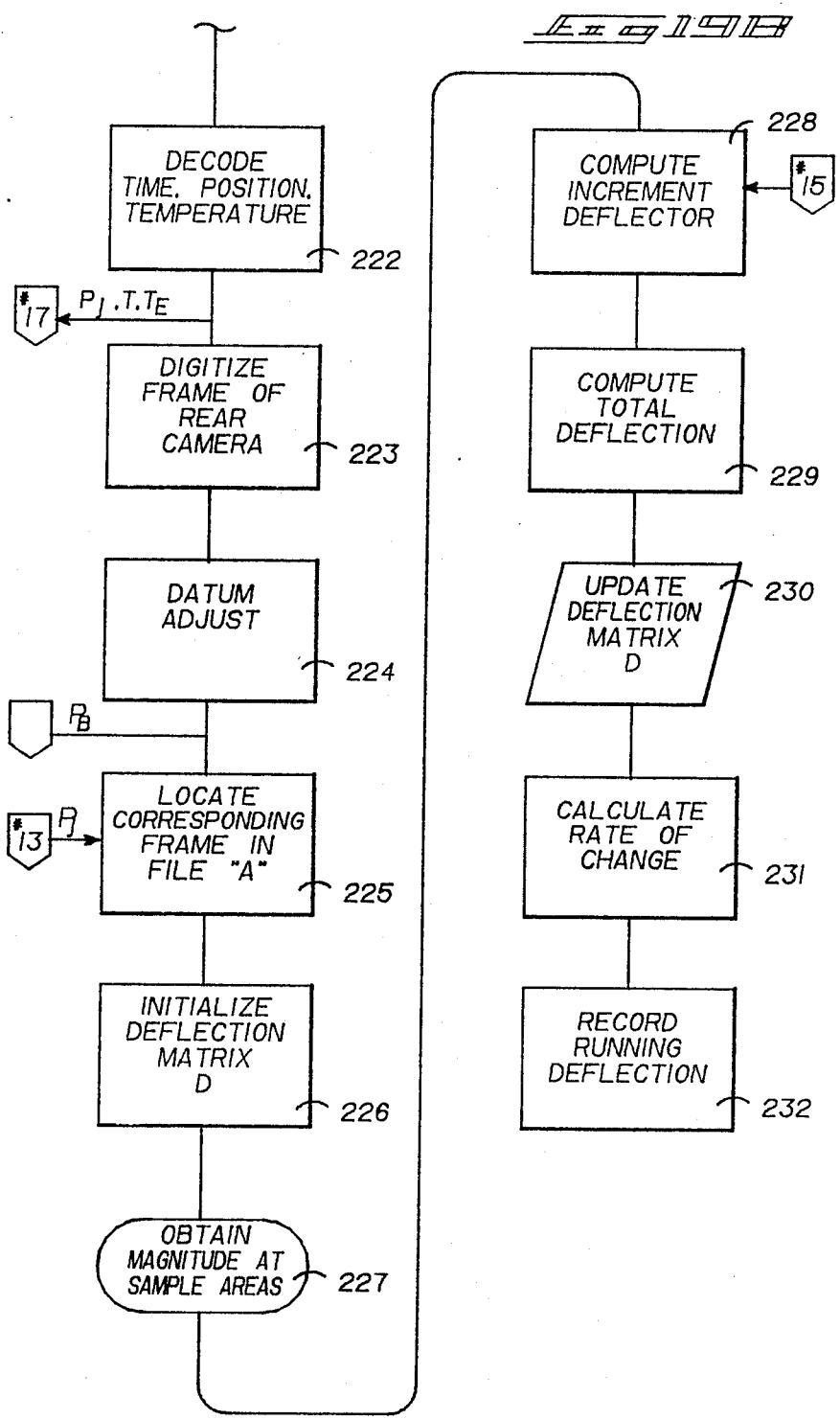

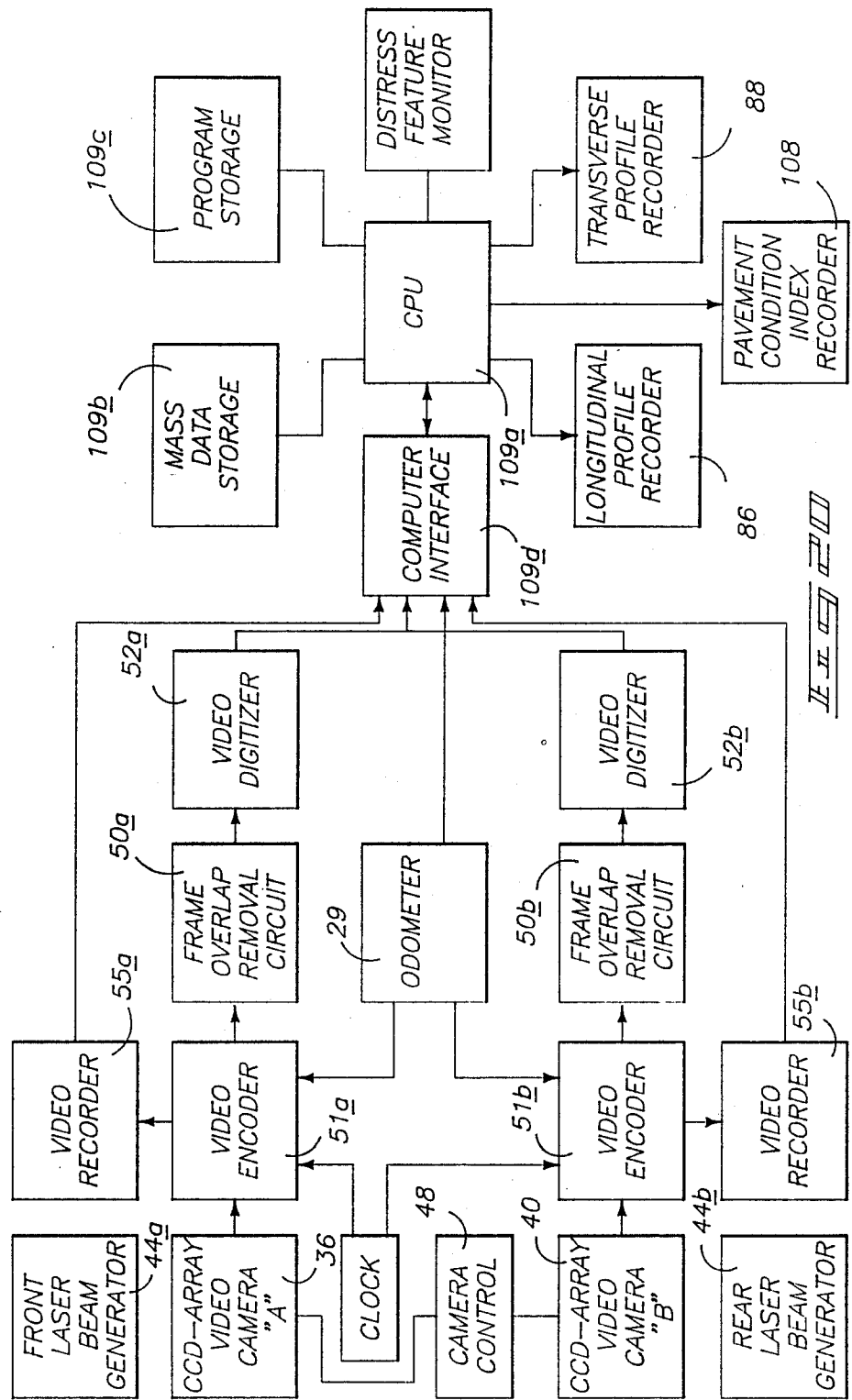

PAVEMENT INSPECTION APPARATUS

TECHNICAL FIELD

This invention relates to pavement inspecting and testing apparatus of the type that is classified in the United States Patent and Trademark Office in Class 72, subclass 146.

BACKGROUND OF THE INVENTION

Pavement in the form of city streets, county roads, airports, state and interstate highways, is one of the most critical elements of a nations's infrastructure. Managing the serviceability of this critical public resource involves obtaining an accurate measurement of the condition of the pavement and relating such conditions to other critical information such as traffic, climate and design information so that current and future needs can be determined and effective maintenance and reconstruction programs can be formulated.

Fundamental to an effective maintenance and reconstruction program is the acquisition of accurate information concerning the condition of the pavement. At the present such procedures for obtaining information are very time consuming and labor intensive and are inherently inaccurate and unreliable. Despite the expenditure of large amounts of money, major reconstruction appropriations are often founded upon very inaccurate and unreliable assessments of the pavement condition and the condition of the subgrade and foundation beneath the pavement.

Despite a number of attempts that have been made to develop equipment for testing the condition of the pavement, most public agencies have utilized a subjective system of analyzing the condition of the pavement by the human eye by directly viewing the pavement surface or indirectly viewing the pavement through the use of photographs that have been taken of the pavement. In the latter process, the photos are analyzed by the human eye to determine the presence and severity of pavement distress features. U.S. Pat. No. 3,151,235 granted Sept. 29, 1964 to Greenshields is an example.

In a somewhat similar context, mobile equipment has been devised in the past for determining the roughness of the road or pavement. Examples of such mobile equipment are illustrated in U.S. Pat. No. 3,983,746 granted to Ross A. Phillips et al. on Oct. 5, 1976 and U.S. Pat. No. 4,422,322 granted to Elson B. Spangler on Dec. 27, 1983.

More recently Highway Products International, Inc. of Paris, Ontario, Canada has developed a "automatic road analyzer" that has a van having a piezo resistant accelerometer mounted on the rear axle for measuring the longitudinal profile of a lane of pavement. It also has a front sensor bumper bar that is seven feet long with fold-up wing-type extensions that extend out to a full lane width of twelve feet. The sensor bar has ultrasonic transducers mounted on twelve inch centers across the bumper for measuring the transverse profile of the road as the van moves down the lane. Rather than taking photographs of the surface of the roadways, the Highway Products International, Inc. equipment also utilizes video cameras for continuously capturing an oblique view of the right-of-way pavement surface that may be visually inspected and kept for retrieval purposes. It should be noted that to cover a full twelve feet lane width the Highway Products International, Inc. equipment requires the implementation of special wide load traffic control procedures because the equipment extends outwardly to a width of twelve feet (wide load). It is very difficult to utilize such equipment during normal hours on a highway or to operate the equipment at the normal traffic speed such as fifty-five miles per hour.

Another company —Earth Technology Corporation, through its Pavement Condition Evaluation Services of Sparks, Nev., is experimenting with placing three linear slit video scanning cameras either along the front bumper or along the back bumper of a van as the van moves over the pavement for scanning one pixel line at a time to develop information concerning the longitudinal and transverse profile of the pavement and to identify the presence and severity of surface distress features. Although Earth Technology Corporation hopes to be able to operate such a system at normal traffic speeds, at the present time it appears unable to do so.

It has been recognized for many, many years that the condition of the subgrade and base may be determined by measuring the deflection of the pavement to a known concentrated load in which the load may be either stationary or mobile. Several attempts have been made to provide equipment for determining pavement deflection. One such device is shown in U.S. Pat. No.4,406,823 granted to Jean-Claude Gressin on Oct. 18, 1983. An earlier effort along this line is shown in U.S. Pat. No. 27,875 granted to G. Swift on Jan. 8, 1974. U.S. Pat. No. 3,888,108 granted to Frank Brands on Jun. 10, 1975 is concerned with measuring of an energy pulse through the pavement as an indicator of its structural strength.

One of the principal objects of this invention is to provide pavement inspection apparatus that is capable of accurately determining and recording the longitudinal and transverse profile of a full lane width of pavement during normal traffic hours with the vehicle moving at normal traffic speed such as 55 miles per hour.

Another object of this invention is to provide pavement inspection equipment that includes a mobile vehicle, such as a van, that does not require the use of any special traffic procedures and that can be utilized at all hours of the day without disrupting or detouring or slowing normal traffic.

Another object of this invention is to provide pavement inspection equipment that is capable of obtaining very reliable and accurate information concerning not only the longitudinal and transverse profile of the pavement, but identification and classification of pavement distress features such as cracks, potholes, slab displacements, and pavement separations.

A still further object is to provide unique pavement inspection equipment that is capable of obtaining accurate information concerning the condition of the pavement subgrade and base in such a way that this information can be obtained from a moving vehicle without disrupting normal traffic flow on the roadway.

A still further object of this invention is to provide unique pavement inspection equipment that is capable of obtaining very accurate information concerning the condition of the pavement at a very low per mile inspection cost that is presented in a summarized and useable form that can be readily utilized by those persons who are responsible for pavement maintenance and servicing.

These and other objects and advantages of this invention will be come apparent upon reading the following detailed description of a preferred and alternate embodiments.

BRIEF DESCRIPTION OF THE DRAWINGS

Preferred and alternate embodiments of this invention are illustrated in the accompanying drawings, in which:

FIG. 2 is a top view of the apparatus illustrated in FIG. 1 showing the position of the cameras with respect to the van and illustrating in dotted line a camera field of view of a full width of a lane of the pavement;

FIG. 3 is a block diagram of the video and electronic components that are a part of the apparatus;

FIG. 4 is a schematic view of a section of the pavement in the view of the cameras showing laser marks formed on the pavement for use as references;

FIG. 5 is an representative section of the pavement in a mass memory showing the location of sampling points for determining the longitudinal and transverse profile of the pavement that is covered by the van;

FIG. 6 is a graphic representative of an area of the pavement illustrating the location of pixel elements within the view of the video camera showing different pixel locations of a feature within the view of the two cameras;

FIG. 7 is a vertical cross-sectional view along the longitudinal direction of pavement showing an illustrated profile having bumps and ridges therein;

FIG. 8 is a vertical transverse cross-section of the pavement showing the location of a rut in the pavement;

FIG. 9 is a plan view of a portion of the pavement illustrating the location, shape and orientation of a crack;

FIG. 10 is a plan view of a section of the pavement illustrating the location and shape of a pothole;

FIG. 11 is a plan view of a portion of the pavement illustrating the shape and orientation of a "D" crack in conjunction with a pavement seam or joint;

FIG. 12 is a plan view of a section of the pavement illustrating the location and configuration of alligator cracks;

FIG. 13 is a vertical cross-section view of the interface of two plates, one being elevationally displaced from the other;

FIGS. 14a-14f are schematic diagrams of a computer flow diagram for the operation of the apparatus;

FIG. 15 is a side view of an alternate embodiment of this equipment illustrating apparatus for determining the deflection characteristics of the pavement;

FIG. 16 is a plan view similar to FIG. 2 except showing the alternate embodiment with a front and a rear video cameras for determining the deflection of the pavement as the vehicle moves over the pavement.

FIGS. 19a-b are schematic diagrams of a flow diagram of a computer program for the operating equipment.

FIG. 20 is a block diagram of video and computer components which are part of an alternate embodiment.

DETAILED DESCRIPTION OF PREFERRED AND ALTERNATE EMBODIMENTS OF THE INVENTION

Figure 1:
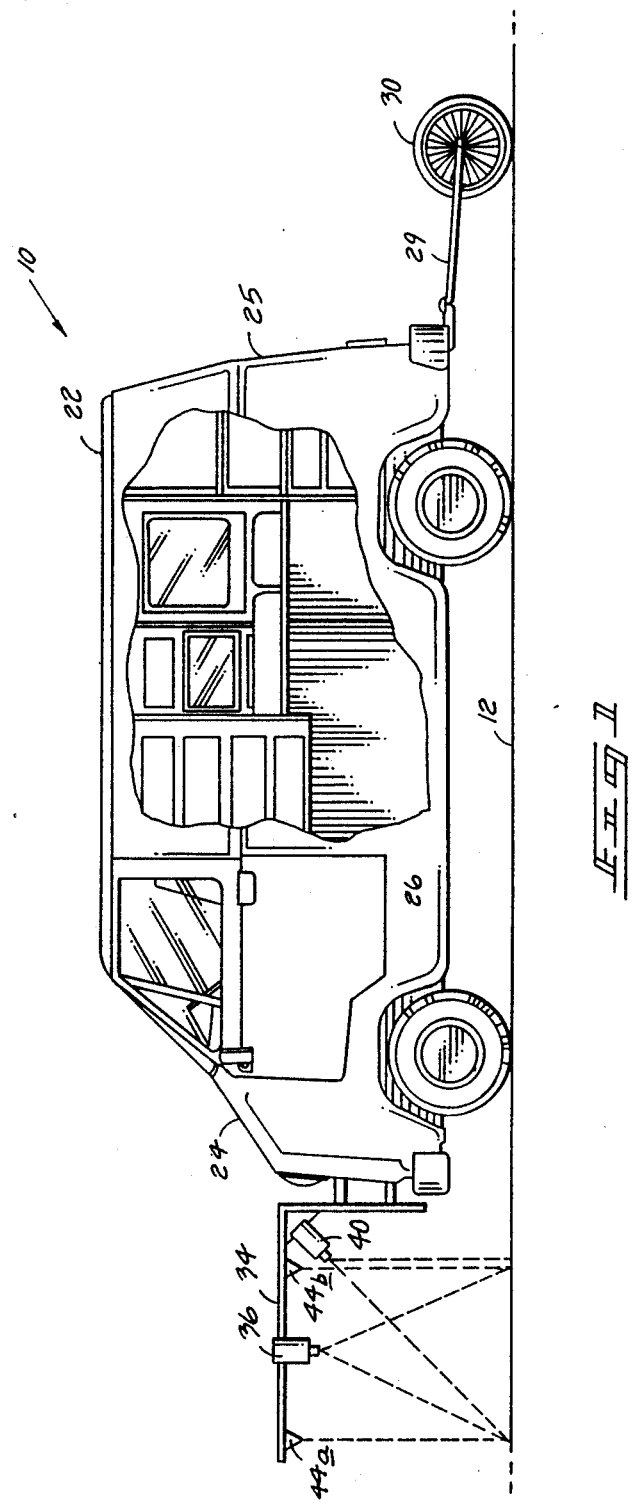
FIG. 1 is a side view of a preferred embodiment of this invention specifically illustrating a wheeled vehicle such as a van having two video array cameras on the van with the cameras projecting towards the pavement at an acute angle to each other.
Figure 14E:
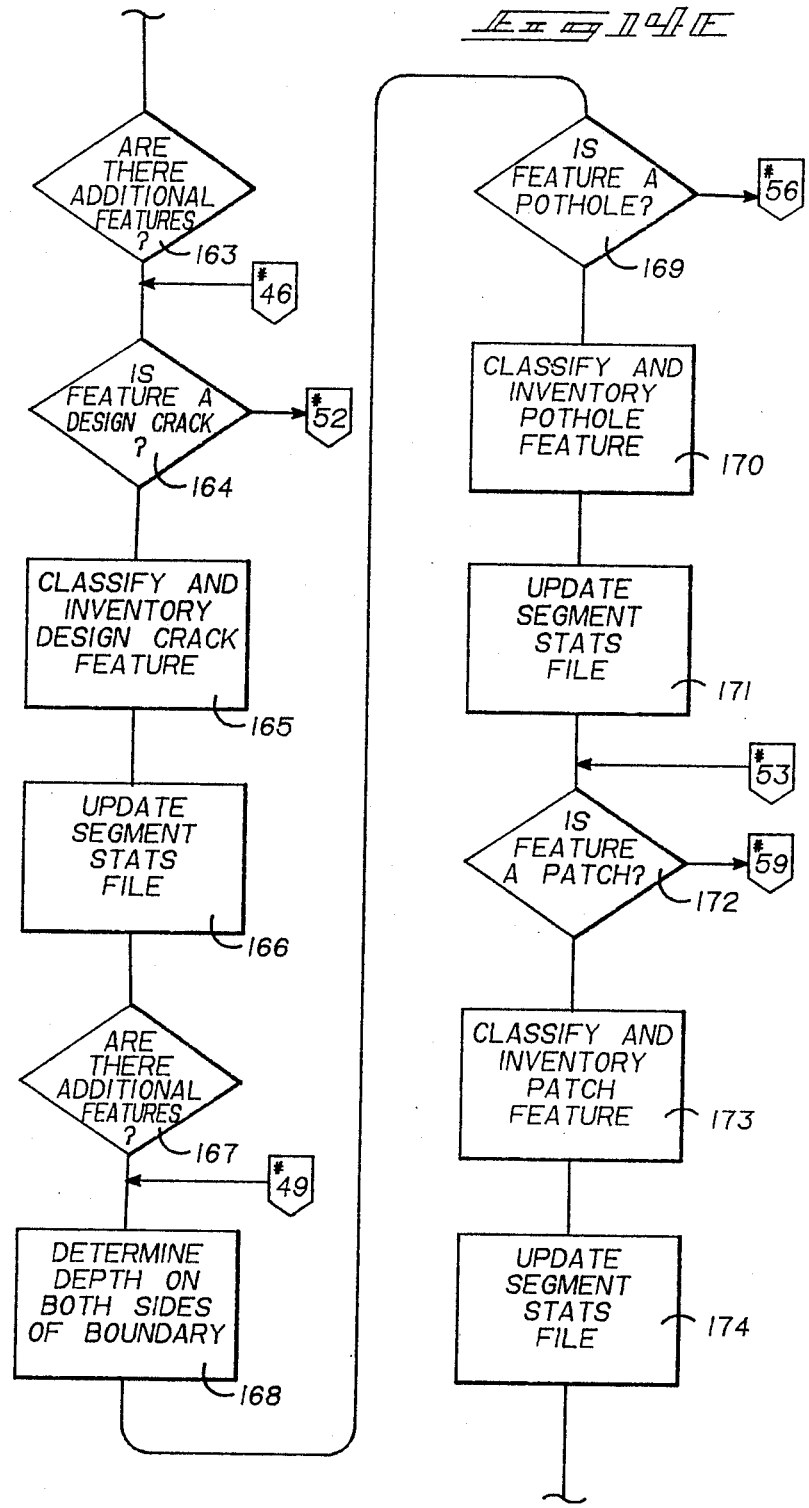

The following disclosure of the invention is submitted in compliance with the constitutional purpose of the Patent Laws "to promote the progress of science and useful arts"(Article 1, Section 8).

The pavement inspection apparatus is generally designated with the numberal 10. The apparatus 10 is designed to inspect a full lane 16 along a selected length of the pavement. The apparatus additionally views a portion of an adjacent lane 16 as illustrated in FIG. 2 and a pavement edge 18 should the lane 14 be the outside lane. A portion of the shoulder or apron 20 is also viewed during the inspection. Most road lanes 14 are 12 feet or less in width. In a preferred embodiment the apparatus is designed to inspect a swath of 13 feet width which is in excess of the maximum lane width.

The purpose of the apparatus 10 is to inspect the surface of flexible or rigid pavement 12 to determine the presence and severity of distress features and to provide an elevational profile of the pavement along the full width of the lane 14. With respect to the longitudinal profile, the purpose of the apparatus 10 is to determine if there is an uneven profile which includes bumps, heaves, or washboards. Frequently the information is gathered with respect to the longitudinal profile in terms of short wave, intermediate wave, or long wave information. FIG. 7 illustrates the longitudinal profile of a section of a lane showing bumps and dips in the lane.

Additionally the elevational profile of the lane provides information concerning the transverse profile across the lane at selected locations to determine whether or not the lane is worn and has formed rutting along the wheel tracks. A rut is shown in a transverse section in FIG. 8.

Furthermore the apparatus 10 determines the location and severity of distress features such as discontinuities such as longitudinal cracks, transverse cracks, joint cracks, "D" cracks, and alligator cracks. The presence, severity and frequency of the cracks within a given pavement segment is symptomatic of the condition of the pavement and possibly the subgrade and foundation/base.

Additionally the apparatus 10 determines the location and severity of potholes or patches and generally determines the general surface roughness of the pavement.

In the alternate embodiment illustrated in FIGS. 15-19, the apparatus 10 is additionally capable of determining the degree of deflection of the pavement along the lane when subjected to a known wheel load. The deflection information reflects the condition of the pavement, subgrade and foundation which likewise is symptomatic of the conditions of the road and its useful life.

VEHICLE

The apparatus 10 includes a self-propelled wheeled vehicle 22 such as a van illustrated in FIG. 1 that is capable of moving down the lane 14 at normal traffic speeds without slowing traffic or causing detours or interfering with normal traffic patterns. The wheeled vehicle has a width of eight feet or less so that no special "wide load" traffic procedures or equipment are required in inspecting the pavement. The vehicle has a front 24, a rear 25 and sides 26 and 27.

The apparatus 10 includes a velocity determining means for determining the velocity of the van on a real time basis. In a preferred embodiment the velocity determining means includes an odometer unit 29 that is attached to the van for accurately measuring the distance travelled by the van and to pinpoint the location of the pavement currently being inspected. The odometer unit 29 includes an odometer wheel 30 that rotates on the pavement in the lane 14. A transducer (not shown) is associated with the odometer wheel for determining the distance travelled with an accuracy of less than one inch. The apparatus further includes a clock 32 (FIG. 3) (preferably mounted in the van 22) that provides the time of day at which the inspection is taking place and provides lapse time information that is utilized in conjunction with the odometer 29 for determining the velocity of the wheeled vehicle at any particular location.

In an alternate embodiment the velocity may be determined by cross-correlating the frame data from the video array cameras to determine the degree of frame overlap between adjacent frames. VIDEO ARRAY CAMERAS The wheeled vehicled 22 further includes a camera support frame 34 that is preferably mounted on the front 24 of the vehicle 22 and projects forward. The frame 34 could alternatively be mounted to the back 25. A first video array camera 36 is mounted on the frame 34 for optically inspecting the lane 14 forward of the vehicle. Preferably the first video array camera 36 projects downward normal to the surface of the pavement 12 and produces a first set of frames of raw electrical video pixel signals or data, concerning or the magnitude of the light radiation reflected by the pavement and received by the camera in an X-Y array (multiple pixel line). In one preferred embodiment, the video array camera 36 is a CCD camera that has high resolution capability for providing electrical video pixel array data in a rectangular field of view 38 indicated by a dotted line in FIG. 2. Preferably the field of view is sufficiently wide to encompass the full width of the lane 14 plus a portion of the adjacent lane 16 and the edge 18 of the pavement and a portion of the shoulder 20. In a preferred embodiment the transverse field of view of the camera 36 is at least thirteen feet and is considerably greater than the width of the vehicle so that at least a full lane of video information can be obtained as the vehicle is propelled down the lane 14.

The apparatus 10 in one embodiment, further includes a second video array camera 40 mounted on the camera support frame 34 for generating a second set of array frames containing electrical video pixel signals or data. The camera 40 is mounted a a fixed distance from and at an acute angle (preferably 45°) to the camera 36 and encompassing a field of view that overlaps with the field of view 38.

Preferably the video cameras 36 and/or 40 are CCD cameras having very high resolutions exceeding 1,000,000 pixels. One particular commercially available video array camera is manufactured by Kodak under the brand name "Megaplus" and has an array of 1,340 pixels in the horizontal direction (X) and 1,037 pixels in the vertical direction (Y) for a total pixel array of 1,389,580.

It is preferable to mount the cameras 36 and/or 40 at a spacing with respect to the pavement 13 so that a single pixel of the camera corresponds to an area on the surface of approximately one-tenth of an inch so that the resolution of the cameras is one-tenth inch/pixel. If desirable, one could utilize a series of laterally spaced cameras in place of a single camera 36 and a series of laterally spaced cameras instead of the single camera 40. In some circumstances it is desirable to utilize a wide angle lens (not shown) with respect to camera 36 and/or 40 to obtain the wide field of view 38 of greater than the width of one lane 14. In the preferred embodiment the field of view 38 extends longitudinally along the lane thirteen feet so that each frame from the cameras 36 and 40 generate surface pixel information from a 13×13 square foot section of the pavement. Video or digital tape recorders 55a and 55b are connected to the encoders 51a and 51b respectively for recording the raw pixel frame data.

SURFACE TO PIXEL CALIBRATION

The apparatus 10 further includes a pixel reference means for determining the pixel to surface distance relationship, ratio, or correlation on a real time basis and to adjust to calibrate the raw pixel data accordingly. As previously stated the apparatus is designed with an approximate 0.1 of an inch/pixel resolution. However the pixel reference means provides a much more accurate and dynamic (real time) determination of the surface distance to pixel correlation. The pixel reference means counts or measures the number of pixels within a video frame between two fixed or defined reference points and determines if the number varies between frames to maintain a real time calibration of the surface to pixel relationship.

The pixel reference means preferably includes a pair of electromagnetic beam generators such as lasers 44a and 44b that are mounted on the camera support frame 34. The lasers 44a and 44b are spaced a preset precise distance such as four feet and direct parallel laser beams downward onto the pavement 12 within the field of view 38. The beams 44a and 44b form corresponding spots, dots or reference marks on the pavement at precise spaced locations in the field of view of the cameras so that each frame of pixel data contains the distance reference or yardstick. The surface distance to pixel relationship may be initially calibrated when the vehicle is stationary. The marks 46a and 46b are illustrated in FIG. 4. The marks 46a and 46b indicate the dots when the vehicle is stationary in which the cameras are vertically stationary. In this example the distance "A" is exactly four feet. A readout of the cameras 36 and 40 show that there are 480 pixels between marks 46a and 46b. Consequently the surface distance to pixel correlation is initially 0.100 inches/pixel.

During movement of the vehicle down the lane the cameras 36 and/or 40 may move up or down depending upon the profile of the pavement. Marks 46c and 46d in FIG. 4 are separated by a distance "B" which indicates an apparent change in the distance between the laser dots due to the vertical downward movement of the cameras. For example, during downward movement the distance "B" may indicate that there are 488 pixels between the marks 46c and 46d. This correlates to a relationship of 0,0984 inches/pixel. When the cameras bounce upward the apparent distance between the dots 46 would be indicated by 46e and 46f being a distance shorter than the reference. For example the distance "C" may indicate a distance of 472 pixels between marks 46e and 46f. This correlates to a relationship of 0.1017 inches/pixel. Consequently each frame contains surface to pixel information on a real time basis for adjusting X-Y reference between the surface distance and the pixel data.

In an alternative embodiment, the reference marks may be established by determining the location of the horizontal pixel rows where the adjacent frames overlap and measure or determine the number of pixels between such horizontal pixel rows.

As illustrative in FIG. 3, the apparatus 10 includes a vertical bounce error circuit 47 that looks at each frame or at periodically sampled frames and determines the pixel count within that frame between the reference marks to determine vertical movement of the cameras and accordingly modify the pixel signal information in relationship to the X-Y surface location of each pixel. It should be noted that reference information is contained in each frame enabling very efficient and real time adjustment of the pixel data to the viewed surface distance (area).

The apparatus 10 includes a camera control circuit 48 that is operatively connected to or integral with the camera for controlling the shutter speed and the frame frequencies. Although both the shutter speed and frame frequencies may depend somewhat upon the nature of the cameras 36 and 40 themselves, it has been found advantageous to utilize a shutter speed and a frame frequency that provides unblurred or geographically undisplaced pixel information at normal traffic speeds such as 55 miles an hour. In this regard, the applicant has found that the camera control circuit 48 is capable of providing a shutter speed of one two-thousandth of a second with the frame intervals or frequencies being 30 frames per second. As previously mentioned each frame contain pixel information representing approximately 13 feet in the longitudinal direction and 13 feet in the transverse direction of the lane 14. The frame frequency may be varied depending upon the speed of the vehicle to minimize the amount of overlap of pixel information that is redundant from one frame to the next as the vehicle travels down the lane. For most cameras, the shutter speed and the frame frequency may be preset.

The apparatus 10 include overlap circuit 50a and 50b that receive the raw electrical video pixel signal information from cameras 36 and 40 respectively and which is responsive to the odometer unit 29 for determining the amount of pixel overlap (redundancy) between adjacent frames. The overlap circuits 50a and 50b remove the redundant electrical pixel signals between adjacent frames so as to present only electrical pixel information that would appear to be continuous ribbon of pixel data as the vehicle moves down the lane.

In an alternative embodiment the overlap electrical pixel signals between adjacent frames are saved for elevational analysis. The overlap electrical pixel signals contain elevational information which may be analyzed to determine the elevational profile of the pavement.

The apparatus 10 includes video encoders 51a and 51b that receive information from the clock 32 and the odometer unit 29 for combining with the pixel information information concerning the time of day, position of the vehicle, the velocity of the vehicle and the distance that the vehicle has travelled from a reference point. This information is placed in each frame along with the raw electrical video signals from the cameras 36 and 40.

ELEVATIONAL PROFILE

The analogue electrical video pixel signals are then directed to video digitizers 52a and 52b that convert the analogue signals to digital signals in which each pixel has magnitude words, and X-Y coordinate words and in which the frame includes time, position, velocity and distance information in digitized form.

The apparatus 10 includes memory maps 56 and 58 (RAM) that are operatively connected to digitizers 52 and 54 respectively for receiving the digitized frame information and for accumulating multiple frame information to form a memory map containing information with respect to a selected length of pavement such as a segment 100 feet in length. The size of the memory map (selected pavement segment length) may vary considerably depending upon the size of memory desired to be dedicated to this task.

The memory maps 56 and 58 are usually formed of random access memory (RAM) which is accessible for signal processing to determine the elevational profile of the segment of pavement and to determine whether the segment contains distress features and the severity of the distress features. FIG. 5 is a representation of the memory map showing a section of pavement approximately 13 feet by 100 feet of digitized pixel information. The depicted memory map is a schematic representation of the memory map containing the pixel information.

The apparatus 10 has signal processing electronics including a vertical elevation determining circuit means identified with the numeral 60 for comparing pixel information in the two memory maps 56 and 58 to determine the elevational profile of the selected information. After the memory maps 56 and 58 are filled with a first set and a second set of frames of pixel data representing the selected length of pavement segment, the elevational determining circuit compares the pixel data at selected longitudinal and lateral surface areas and determines the elevation of the pavement at the selected locations. The vertical determining circuit means 60 has sample and hold circuits that are preselected to sequentially select only certain areas of the maps to investigate. For example in FIG. 5 there is illustrated a number of sample areas generally designated with the numeral 62 that are spaced both laterally and longitudinally. The elevation determining circuit means 60 analyzes or samples the magnitudes of the pixel data in each of the memory maps in a longitudinal and transverse directions forming a cross within each sample area 62 to determine the X-Y location of the pixel having the maximum value. A frame comparison circuit then compares the X-Y information for each pixel of maximum value of a sample area. The frame comparison circuit determines the X-Y coordinates of the maximum value pixel within the sample area 62 and determines the X-Y distance between the pixels having the maximum values. For purposes of example, a pixel 64 is shown in FIG. 6 as having the maximum amplitude with respect to area 62 in memory map 56. The same sample area of memory map 58 is superimposed indicating the X-Y location of pixel 66 of maximum amplitude for area 62. The frame comparison circuit compares the distance "D" in pixels between the two locations 64 and 66 with the magnitude of the difference "D" representing the elevation of the surface of the pavement at the particular sample area 62 in relation to a reference plane. Consequently the elevation at each sample area 62 throughout the entire pavement segment may be determined by comparing the pixel location of the same surface point in each of the two memory maps 56 and 58. If the two pixel locations 64 and 66 are the same then it would indicate that the sample area is at the same elevation as the reference plane.

As illustrated in FIG. 6, the circuit means 60 samples a multitude of sample areas 62 transversely across the memory maps 56 and 58 respectively at space longitudinal locations. In the example illustrated, the longitudinal spaced intervals are at five feet intervals and the lateral intervals are six inches. Lateral intervals and the longitudinal intervals may be adjusted as desired to obtain the elevational profile resolution desired by the user. In FIG. 5 of memory map 56, wheel tracks 68 and 70 are superimposed thereon to illustrate the lateral intervals across the entire width of the lane including the wheel tracks 68 and 70.

FIG. 7 illustrates a longitudinal profile of pavement 12 in which the elevation of the surface area has been determined by the elevation determining circuit means 60. The pavement is supported on a subgrade layer 74. FIG. 7 shows bumps 76 and dips 77 forming a washboard in the longitudinal profile of the pavement. The results of the frame comparison circuit are processed by a longitudinal profile circuit 80 which compares the results against preset thresholds to determine the degree of elevational deviation from a reference plane to determine the slope of the bumps and dips and the frequency with which the bumps and dips occur and classifies the results in accordance with their severity and frequency within the pavement segment.

For example, if rather small dips and bumps are located at rather close intervals, then it would indicate that the pavement 12 forms a washboard which may indicate a rather severe condition. However if the same size dips and bumps are located randomly at rather large intervals, then the classification may be considerably less severe. If a bump or dip has a rather large magnitude then it may be classified as a very serious surface condition and given a higher priority classification. The classification system may vary depending upon the type of road or highway and upon the criteria used by the maintenance organization. Consequently the frequency and amplitude of the elevational features are compared against preset standards or thresholds to determine a composite quotient for the longitudinal segment of the pavement. Such values determined by the longitudinal profile circuit 80 are recorded by a longitudinal profile recorder 86.

FIG. 8 illustrates a transverse section of the pavement with a rut 82 formed in the right wheel track 70. The apparatus includes a tranverse profile circuit 84 that is responsive to the information determined by the frame comparison circuit for evaluating the transverse elevational information with respect to the slope, amplitude and frequency of the elevational information and compares the information against preset thresholds to determine the severity of the elevational information. The depth and width of ruts 82 in the wheel tracks 68 and 70 are very important an an indicator of pavement wear by the traffic. Additionally the rut information is an indicator of the condition and performance of the subgrade layer 74 and its foundation or base. A transverse profile recorder 88 records the information obtained from the transverse profile circuit 84 to record the classification and condition of the pavement as recorded at spaced longitudinal intervals along the pavement and forming a composite picture of the severity of the transverse elevational changes on the surface from one side of the lane to the other side of the lane.

In an alternate embodiment, a single camera 36 is utilized in which the overlap pixel signals are saved and analyzed to determine the elevational profile of the pavement. The overlap pixel signals contain elevational information. Rather than using two cameras, one spaced with respect to the other, the alternate embodiment uses a single camera in which the overlap frame pixel signals represents a view of the same surface from a spaced location and at an inclined angle. Consequently the overlap pixel signals of each frame is analyzed in a similar manner to obtain the elevational profile.

SURFACE DISTRESS FEATURES

The apparatus 10 further includes a surface distress detector circuit 90 that is responsive to the digitized video information stored in memory map 56 (RAM) for determining the presence of surface distress features that exceed preset thresholds. Initially the detector 10 evaluates the information in the memory map 56 to determine if there is any digital information the magnitude of which exceeds a preset "feature" threshold. For example, the detector circuit 90 will determine whether or not there are any magnitude values in the memory map that exceed ±10% from an average of all of the pixel values. A feature enhancement circuit 91 then converts the digitized information to the same value (normalize) for all points that do not exceed the preset deviation value. Unless the magnitude exceeds the threshold it is not considered significant. Such normalization enhances or emphasizes those pixel values that exceed that threshold. The pixel values above the threshold are preliminarily considered features. The surface detection circuit 90 then determines the boundary and X-Y location of the boundaries of the "features" in the memory map 56.

In an alternative embodiment, rather than comparing the pixel values to a magnitude threshold deviation, the pixel values are differentiated by first order differential equations to determine the degree of change between pixel values and to identify features only if there is a rapid change in values, identifying the location of a "sharp edge" of a feature. Such a technique can be referred to as "Sobel" filtering.

The apparatus 10 includes a size, shape and orientation circuit 92 that receives the enhanced information from the surface detector circuit 90 and evaluates the information to determine the size, shape and orientation of each of the surface distress features. If the size of the particular feature is below a certain threshold value, then the failure is classified as a general irregularity or a roughness feature. The size and shape circuit 92 determines the width and length of each of the features and the orientation of the feature and compares the distress feature to preset threshold values to determine if the features are longitudinal cracks, transverse cracks, alligator cracks, D cracks, potholes, or the like. As illustrated in FIG. 9, the size and shape circuit 92 measures the distances E and F of a particular feature and applies an aspect ratio to determine whether it is a longitudinal or a transverse crack. The size and shape circuit 92 determines the locations of the boundaries or edges 93 of each distress feature.

In FIG. 9, a crack 95 is shown in that its aspect ratio of length to width or width to length is compared to preset thresholds. With respect to the evaluation of alligator cracks 96 (FIG. 12), the proximity of the boundaries with respect to each other and their boundary overlap is determined in its classification. A "D"

crack 97 is illustrated in FIG. 11 in which the crack 97 is at the boundary of the pavement with a seam or joint 100.

If a distress feature is determined to be either a pothole 102 or a patch, then the surface defect detector circuit 90 determines the elevation of the pixel information within the boundary to determine whether or not it is a patch or a pothole. In this analysis, elevational information is obtained from comparing the memory maps 56 and 58 as previously discussed.

FIG. 13 illustrates a vertical slab displacement distance G. At every seam or joint in the pavement, analysis is made by the surface defect detector 90 as to the elevation of the slabs on both sides of the joint or seam 100 to determine if there is any vertical displacement. Generally vertical displacements of slabs on either side of the joint is an indication of a rather severe condition of the subgrade and/or foundation.

A distress feature classification circuit 94 then compares the particular values of the distress features against preset severity thresholds to determine their severity. Additionally, the proximity of the distress features with respect to each other is determined to indicate whether or not a particular area of the pavement is more highly distressed than another even though one or more of the features by themselves are not particularly severe.

The data from the defect classification circuit 94 is compiled and analyzed by the pavement condition index circuit 100 to determine the severity and number of surface distress features and their relative proximity within the length of pavement that is represented by the memory maps 56 and 58. This data is correlated and recorded electronically in a pavement condition index recorder 108 as a condition value representing the overall condition of the length of pavement.

Although the digitized pixel information in the memory maps 56 and 58 may be processed using discreet electrical circuits, it is preferred to utilize a computer having a CPU, 109a a mass memory 109b such as a RAM, a program ROM memory 109c and computer interface 109d for processing the pixel data utilizing a computer program stored in ROM. A block diagram is illustrated in FIG. 20. A flow diagram of the program is shown schematically in FIG. 14a–14f.

The program consists of a sequence of steps starting with step 110 entitled "input frame" which operates the camera control circuit 48 to obtain a frame of X-Y array pixel data from camera 36 corresponding to the incident electromagnetic radiation from the pavement within the field of view 38. Likewise step 110 inputs the frame pixel data from camera 40. Step 112 takes the output of the sensor from the odometer 29 and the clock 32 and decodes the information and places time, position, velocity and distance information on the frame to identify each frame. Step 114 causes the raw input frame information to be digitized to form digital information representing the magnitude and X-Y coordinates of the incident energy identified with each pixel in the frame. In an eight bit word, 256 different shades of gray may be identified for each pixel.

Step 116 involves analyzing the digitized frame information to locate the high intensity laser reference marks within the frame. In step 118 the distance (in pixel count) between the marks is determined and compared to a standard to determine if there is a deviation from the standard that would indicate vertical movement of the camera. If there is movement in the camera, then the X-Y coordinate pixel information is adjusted to indicate the pixel to pixel center surface distance for that particular frame. Steps 116 and 118 correlate the surface distance with the center-to-center pixel distance to provide a real time continuous calibration. Step 120 involves adjusting the X-Y pixel coordinates in each frame to reflect the real time calibration.

Step 122 involves determining the amount of overlap of redundant pixel information from one frame to the next. Step 122 is responsive to the information from the odometer 29 to determine the degree of overlap between one frame and the adjacent frame in the longitudinal path in the lane. Step 123 provides for the removal of the redundant or overlap information between adjacent frames. Step 124 involves truncating the digitized information in a frame. Step 125 involves storing the truncated pixel data from both cameras 36 and 40 in the memory maps 56 and 58 respectively. Succeeding truncated pixel frames from cameras 36 and 40 are successively stored in the memory maps 56 and 58 respectively until the memory maps are full or until a preset length of pavement has been inspected.

In decision step 126, the process is continued until the memory maps 56 and 58 are full for a particular chosen or selected segment of the lane. In the given example, the information is stored in the memory maps 56 and 58 until a length of approximately 100 feet of pavement frame information has been loaded into the memory maps 56 and 58. In step 127, the memory maps 56 and 58 are initialized to determine the sampling intervals (longitudinal and tranverse) to be analyzed to determine the elevational profile of the length of pavement represented in the memory maps. In the example given, the sampling is taken laterally at every six inches across the lane and at every five feet along the longitudinal length of the lane. In step 128, pixel information concerning the corresponding areas 62 from both memory maps 56 and 58 are input from the respective files for comparison in sample and hold circuits. In step 129, a review is made of the magnitudes of the pixels within the sample area 62 of the memory map 56 (camera 36) to determine the location of the pixel having the greatest magnitude in the sample area 62. In step 130, the X-Y location of the pixel with the greatest magnitude is determined.

In step 131, the X-Y location of the greatest magnitude pixel from memory map 58 is determined for the corresponding area. In step 133, the pixel distance "D" between the same surface points as seen by the two cameras, as illustrated in FIG. 6 is determined as representative of the elevation of the area 62 with respect to a reference plane. Steps 128–133 are continued in a loop until the decision has been made in step 134 that the elevation at each of the sampling areas has been determined. Once all of the sampling locations have been analyzed, the information is supplied to the longitudinal profile evaluation circuit and the transverse profile evaluation circuit for determining the slope, frequency, etc., of elevational features within the pavement to determine the severity of the surface profile with respect to preset thresholds. That information then is recorded in the longitudinal profile recorder and the transverse profile recorder to indicate the elevational profile of the pavement.

As indicated in step 135, a profile matrix of the segment of the pavement is made through the longitudinal profile evaluation circuit and the transverse profile evaluation circuit with the information being recorded in the profile matrix recorders.

In summary, steps 127 through 135 determine the elevational profile of the lane of pavement being investigated. In step 133, the information is calculated with respect to the difference between the location of the pixel in the two memory maps in relationship to the projected angle of camera 40 with respect to camera 36. It should be understood that the sampling resolution may vary depending upon the users desires. If higher resolution information is desired, then the intervals between the sampling areas may be less. However, if lower resolution is acceptable, then the distances between the sampling areas may be increased. In step 135, each segment of pavement has a profile matrix created that is stored.

Starting with step 136, the program initializes the beginning pixel line of each pavement represented in the memory map 56 to have a reference location for determining the location of surface distress features. In step 136, the memory map 56 is broken up into sections so that distinct distress features may be determined for each particular section. In one example, one may want to look at the distress features in a section that measures four feet in the longitudinal direction and thirteen feet in the transverse direction. Consequently in step 137 the number of pixel lines constituting a four foot longitudinal section is determined.

In step 138, a calculation is made concerning the mean and range of gray-scale values of the pixels within that thirteen feet by four feet sample segment. In step 139, the gray-scale values of each of the pixels within the segment are evaluated to see how close they are to the mean value. If they are within a preset percentage deviation (threshold) then the values are set at the mean value (normalized). In decision step 140, it is determined whether or not all of the pixel values fall within the range. If they do, it is determined that there are no significant surface distress features within that segment and the program then proceeds to look at the next adjacent segment. If it is determined in the decision step 140 that not all of the pixel values fall within the range, then one proceeds to step 141.

In step 141, it is determined whether any significant distress features are located in the section. In step 141, the number of contiguous feature pixels is compared to a preset value to initially determine feature area size. For example, if there are forty or more contiguous pixels that exceed the threshold value, then a decision is made that there is a significant feature within the section. If there are less than forty contiguous pixels, then this fact is recorded as surface roughness and that is recorded as a distress feature, usually of lesser significance. Step 142 is a decision step that a significant feature (greater than 40 contiguous pixels) was found. In step 143, an evaluation is made to determine the X-Y locations of the boundaries of the found feature. In step 144, the pixels adjacent to the boundary are re-evaluated with respect to the original values within a much closer tolerance such as a ±5% to determine a more precise location of the boundaries and to enhance the boundary or edge resolution of the feature. In step 144, the pixel information is normalized by interconnecting discontinuities in adjacent pixels if the discontinuity is less than a certain number of pixels. For example, if there is a gap of less than four pixels, then that is determined to be a insignificant gap and the values of the pixels in the gap are set to a value corresponding to the boundary so as to normalize the information and to enhance the boundary identification. If the gap is greater than four pixels, then it is determined that the feature is an adjacent distress feature which will be analyzed separately. In step 146, the elevation of the area within the boundary of the feature is determined utilizing the process in steps 128 through 133 to determine the depth of the distress feature. The depth values of pixels within the boundary of the distress feature are compared to preset values to determine if the depth of the feature is significant. For example, if the depth range is ±10% then it is determined that it is not insignificant.

If the depth of the distress feature is significant as determined in step 147, then the program proceeds to step 148 to determine the length, width and aspect ratio of the distress feature. The aspect ratio is the ratio of the length to the width. After such information is obtained, the process proceeds to step 149 which evaluates the information to determine whether or not the feature is significant and whether it is a longitudinal crack. To be a longitudinal crack, the length is evaluated with respect to a minimum crack length and width to determine whether the crack is significant or should be ignored. For example in a preferred embodiment, the minimum threshold indicates that the length of the feature should be at least 12 inches long. If the aspect ratio is greater than a certain value, then it is classified as a longitudinal crack. For example in the preferred embodiment if the aspect ratio of the length to the width is greater than 8, then it is determined to be a longitudinal crack and is classified and inventoried as such in step 150.

In step 150, the severity of the longitudinal crack is also determined by comparing the dimensions to certain threshold values, usually established by a government agency responsible for maintaining the pavement. For example if the width of the crack is less than one-half inch, then it is classified as a minor Class I longitudinal crack. If the crack has a width between one-half and two inches it is classified as an intermediate or Class II crack. If the longitudinal crack has a width greater than two inches, then it is classified as a major or Class III crack. In step 151, the information is placed in a pavement section file concerning distress features relating for that section.

In decision step 152 it is determined whether or not the previous feature was the only feature in the segment or whether there are still significant remaining features. If the additional feature is not a longitudinal crack then the program proceeds to the decision of whether the feature is a transverse or design crack in step 153. In step 153, the aspect ratio is compared against a threshold value such as 0.125. To be significant the feature must have a minimum length of six inches to be classified as a transverse crack. In step 154 the transverse crack is classified with respect to severity into a number of classifications. For example, if the width of the transverse crack is less than one-half inch it may be classified as a minor Class I transverse crack. If the width of the transverse crack is between one-half and two inches then it may be classified as an intermediate Class II crack. If the width of the transverse crack is greater than two inches it may be classified as a major or severe Class III crack. In step 155 such information is loaded into the statistical file for that segment and the process is repeated to determine if there are any other significant features.

If none of the other features fall within the categories of transverse or longitudinal cracks, then in step 157 the feature is evaluated with respect to its cross-sectional area. In decision step 159, the area of the feature is compared against a cross-sectional area threshold to determine whether the feature is significant. If it is not it is then classified as surface roughness and is catalogued accordingly. For example if the cross-sectional area is greater than two and one-half inches it is determined that it is a significant distress feature.

Then program step 160 determines whether it is a alligator crack by looking at the adjacent areas to determine whether there are three or more polygons that are adjacent to each other. If there is not, then the feature is further analyzed in subsequent steps. If it is an alligator crack as determined in step 160, then the alligator crack is analyzed and classified according to the severity of the alligator crack. For example, if the area is less than a certain value, then it may be classified as a minimum alligator crack. If it falls within a certain intermediate evaluation it is determined as an intermediate crack, and if it it exceeds a higher value then it may be determined as being a severe or major alligator crack. Such information then is updated in the file for that segment in step 162.

Then in step 163, the question is asked whether there are additional features in the segment. If there are, then they are analyzed accordingly to determine whether or not they are a transverse crack, longitudinal crack, alligator crack and the like. In step 164 a measurement is made to see if the feature is a design or "D" crack in which one of the boundaries of the feature is a seam or expansion joint as illustrated in FIG. 11. If it is determined to be a design crack, then it is classified such in step 165. Information is placed in the statistical file in step 166.

In decision step 167 the question is asked whether there are any other additional features. If there are, then a determination is made with respect to the depth of the feature on both sides of the boundary to determine whether it may be a pothole or a patch. If the elevation drop is greater than 30% within the feature as compared to the area outside the boundary, then it is indicative of a pothole as determined in step 169. The severity of the pothole is classified and inventoried in step 170; and updated and placed in the statistical file for the segment in step 171.

If the elevation does not indicate that the feature is a pothole then it is evaluated to see if the pixel information within the boundary indicates it is an elevation rise of greater than a certain threshold, such as 15% ; indicating that it is a maintenance patch. This determination is made in step 172. If it is determined to be a patch, then the severity of the patch, particularly size, is determined in step 173 and classified in the statistical file and inventories in step 174.

In previous evaluations, if it was not determined to be significant it was generally classified as a possible roughness. In step 175, the physical size of the unclassified other or miscellaneous features are determined in step 176 and placed in an appropriate statistical file as general roughness for that segment.

An additional calculation is made if design cracks are identified to determine whether there is a slab elevational change on either sides of the seam or joint indicative of slab displacement or pavement separation. In step 176, depth measurements are made concerning the elevation of the slabs on both sides of the joint. The information is value rated in step 178 to determine whether or not there is significant slab displacement. If it is, the information is placed into the statistical file for the section in step 179.

In a preferred embodiment, it is desirable to compute the absolute value and the rate of change of the rut depth in the longitudinal direction in the wheel track 70. Thus in step 180 the rut depth is calculated in the longitudinal direction separate and apart from the general profile elevations. The rut depths are calculated using the techniques of steps 127–135. Calculations are made of rut depth with respect to its mean value, range and standard deviation over the wheel track for each segment. The rut depth information is stored in step 181. Like calculations are made in steps 182 and 183 with respect to the general longitudinal profile.

In step 184, a general pavement condition index for the entire pavement segment is calculated by combining all of the information concerning the transverse profile, the longitudinal profile and the surface distress features. The variables and the weight given to each of the variables to be calculated in the pavement condition index may vary from user to user. However, the index is usually a summary indication of the general condition of the segment that has been investigated. In step 185 the program returns to the beginning and looks at the next segment along the length of the pavement for the particular lane being driven.

DEPRESSION SENSING (STRUCTURAL STRENGTH TESTING)

In an alternate embodiment illustrated in FIG. 15, the apparatus includes in addition to the previous equipment, the additional feature for determining the dynamic displacement of the pavement in which the pavement is subjected to a known vertical force as the van moves over the pavement in the lane. In the embodiment illustrated in FIG. 15, a trailer 190 is towed behind the van 22 and is part of the apparatus 10. The trailer 190 has a known weight for applying a known vertical downward force on the pavement through the wheels. It is preferable to determine the pavement deflection in one of the wheel tracks such as the right wheel track 70 as illustrated in FIG. 16.

In the alternate embodiment, a third video array camera 192 FIG. 15 is mounted on a projecting frame 194 forward of the vehicle over the right wheel path 70 for inspecting the pavement of the right wheel track forward of the van 22 in its undeflected condition. The information from camera 192 provides a reference for use in calculating the deflection. A similar camera 196 is mounted on a frame of the trailer 190 having a field of view 197 immediately behind a loaded wheel of the trailer 190 in the right wheel track for inspecting the deflection of the pavement due to the weight of the trailer as the trailer passes over the pavement.

Figure 17:
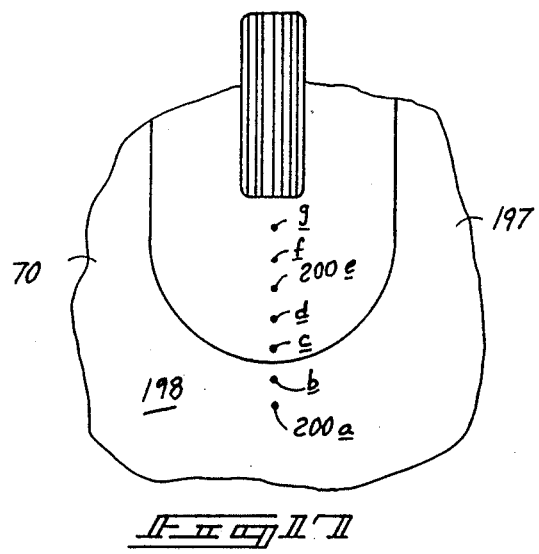
FIG. 17 is a graphic representation in plan view of rear video camera view of a deflection basin.
Figure 18:
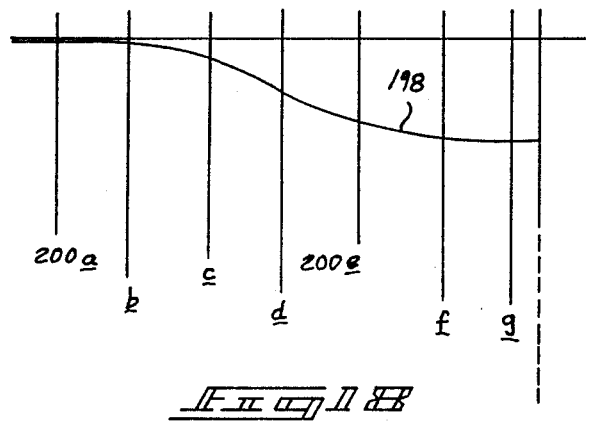
FIG. 18 is a graphic representation of the deflection curve of the pavement of the deflection basin.

Although the video camera 196 is not able to visually inspect the depression made by the traveling wheel immediately below the wheel, it is able to visually view a major portion of the deflection basin or depression 198 formed in the pavement. FIG. 17 illustrates a field of view of the depression 198. Specific sampling points 200a–g are indicated within the basin for determining the elevation (deflection) at each of the sample points to enable a deflection curve as illustrated in FIG. 18 to be devised. The camera 196 generates analogue electrical video data reflected from the basin 198 that is indicative of the depth of the depression. Each of the pixel values is indicative of the radiation reflected from a specific pixel area of the basin. It is known that the amount or magnitude of the radiation is proportional to the slope of the surface at the particular pixel location. Consequently, the slope at each particular sampling point 200a–g is determined and its corresponding depth may be calculated. The sum of all of the sample points equals the total deflection. The deflection is an indicator of the structural condition of the pavement, subgrade and foundation of the road bed.

Preferably the information is processed utilizing a computer with (1) a CPU, (2) mass data storage (RAM) and (3) a program stored in ROM. A flow diagram of a sample computer program is illustrated in FIGS. 19a–b.

Step 210 inputs the frame information from the forward camera 192. For example in a preferred embodiment, the frame information would correspond to the right rut and include information from a swath that was three feet long and five feet wide for each frame. Information from the odometer 29 and the clock 32 is combined with the pixel data in step 211 so that each frame has identifying information as to time, position, distance and velocity. The frame information then is digitized in step 212.

In steps 213 and 214, the pixel distances between the laser references marks are measured to correlate the pixel X-Y coordinates with the pavement surface being viewed by the camera 192. If there is a deviation from the standard value then the frame pixel data is adjusted in step 215.

In steps 216–218, the amount of adjacent frame overlap of redundant pixel data is determined and removed from the frames in response to information from the odometer 29. The remaining, nonredundant pixel information is then stored in a memory file or map such as RAM in step 219. The frame pixel data will be sequentially stored in the memory map until the map is full or until a preset length of pavement has been viewed. For example it may be desirable to accumulate information for a pavement segment of up to 100 feet in length in which each recorded segment or portion is three feet wide and five feet long. Consequently in step 220, the memory map is successively loaded with the frame pixel data until the full 100 length of information had been obtained (first set of frames).

In step 221, the pixel data from the rear camera 196 is received in which each frame is identified with time, position and pavement temperature information along with the pixel data from the camera 196. The frame data then is digitized in step 223. In step 224, the information is adjusted depending upon the vertical movement of the camera 196 as previously discussed in similar steps 213-215. In step 225, location and values of pixel data from the first set of frames of the forward camera 192 corresponding to the sample points 200a–g is retrieved and used as a comparison reference as an indication of the values of the undeflected pavement of the sample points. As illustrated in FIG. 15, the distance "L" between the cameras 192 and 196 is utilized in cross-correlating the corresponding pixel data between the two sets of frames. Step 226 is quite important since it initializes the X-Y location of each sample point in the frames from the rear camera 196. Such locations are indicated by the numerals 200a–200g in FIG. 17 and 18. In step 227, the pixel magnitude information at each of the sampling points 200a–g is obtained.

In step 228, the incremental vertical displacement at each sample point 200a –g in the deflection basin is calculated. In step 229, each of the incremental deflection values are added together to compute the total deflection in the basin. In step 230, the pavement deflection information is added to a common file to provide pavement deflection values at selected intervals along the lane. In step 231 calculations are made concerning the incremental change of the values in relationship to the distance to determine the rate of change of the deflection along the road which is indicative of changes in the quality of the road bed itself. In step 232, such information is recorded for each segment of pavement.

Although not shown, the apparatus includes lighting for artificially illuminating the field of views of the cameras 36, 40, 192 and 196 to enable the apparatus to be utilized at any time during the day and to minimize the effects of shadowing.

Upon reviewing the foregoing material it can be appreciated that the apparatus 10 is very versatile and is capable of being operated during normal traffic times and at normal traffic speeds without disrupting normal traffic flow and requiring the use of unusual procedures such as "wide load" procedures. The system is capable of obtaining very accurate information concerning the condition of the pavement at a very reasonable cost per mile. Furthermore the amount of time required to inspect long segments of pavement is greatly reduced, providing pavement engineers with more accurate information in a shorter period of time.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. Pavement inspection apparatus for inspecting and determining the surface condition of a length of pavement, comprising:

a surface vehicle for moving over the length of the pavement being inspected;

a pair of electromagnetic beam generators mounted on the vehicle for directing two spaced high intensity electromagnetic reference beams onto the pavement surface forming two horizontally spaced reference marks on the pavement surface that move over the surface as the vehicle is moved over the length of the pavement;

a first video camera mounted on the surface vehicle projecting toward the pavement surface having a first field of view of a segment of the pavement surface containing the two reference marks for optically inspecting the pavement for surface defects;

a second video camera mounted on the surface vehicle spaced from the first video camera and projecting onto the pavement surface at an acute angle with respect to the first video camera having a second field of view that has at least a portion in common with the first field of view containing the two reference marks for optically inspecting the pavement for surface defects; and video signal processing means operatively connected to the first and second video camera for determining the surface condition of the length of pavement travelled by the surface vehicle.

2. The pavement inspection apparatus as defined in claim 1 further comprising:
   velocity means for determining the speed that the vehicle travels over the length of pavement;
   recording means operative connected to the velocity means and the video processing means for recording the location of any surface distress features.

3. The pavement inspection apparatus as defined in claim 1 wherein:
   the first video camera generates a first set of frames of electrical pixel video output data representing reflected light intensities from longitudinally spaced surface locations as the vehicle moves over the length of the pavement;
   the second video camera generates a second set of frames of electrical pixel video output data representing reflected light intensities from the longitudinally spaced array of surface locations, but from a different angle, as the surface vehicle moves over the length of the pavement; and wherein the apparatus further comprises:
   electronic frame comparing means for comparing the electrical pixel output data of the first and second sets of frames to determine the vertical elevation of at least a portion of the surface locations; and
   electronic profile generating means operatively connected to the electronic frame comparing means for generating an electronic elevational profile of the length of the pavement.

4. The pavement inspection apparatus as defined in claim 3 further comprising:
   vertical movement detection means responsive to vertical movement of the cameras with respect to the pavement surface as the vehicle travels over the length of the pavement for adjusting the electrical pixel video output data to eliminate error caused by vertical movement of the cameras.

5. The pavement inspection apparatus as defined in claim 3 wherein the electronic profile means includes longitudinal profile means for generating a electronic longitudinal profile along the longitudinal length of pavement.

6. The pavement inspection apparatus as defined in claim 3 wherein the electronic profile means includes a rut profile means for generating electronic transverse profiles of the pavement surface at selected intervals along the length of the pavements to determine the degree of pavement rutting.

7. The pavement inspection apparatus as defined in claim 3 further comprising a recording means for recording an electronic profile of the length of pavement.

8. The pavement inspection apparatus as defined in claim 3 wherein the electronic frame comparing means includes (1) X-Y reference means for determining the same surface locations in the first and second set of frames, (2) spatial comparing means for determining spatial pixel distances between the same surface locations in the first and second set of frames and (3) elevational calculating means responsive to the determined spatial pixel distances and the acute angle between the first and second video camera means for calculating the vertical elevations of the surface location.

9. The pavement inspection apparatus as defined in claim 1 wherein the vehicle has a width of 8 feet or less and wherein the first and second cameras each have a lateral field of view greater than 12 feet.

10. The pavement inspection apparatus as defined in claim 1 wherein the vehicle has a width of less than 8 feet and is capable of travelling along a paved road at normal traffic speeds and wherein the video camera are capable of generating frames of unblurred electrical pixel video output data when the vehicle is moving at normal traffic speeds.

11. In a pavement inspection apparatus for inspecting and determining the surface condition of a length of pavement, comprising:
   a surface vehicle for moving over the length of pavement being inspected;
   a pair of electromagnetic beam generators mounted on the surface vehicle for directing two spaced electromagnetic reference beams toward the pavement surface forming two spaced horizontal reference marks on the pavement surface as the surface vehicle moves over the length of pavement;
   a first video camera means mounted on the surface vehicle and directed toward the pavement surface having a first field of view of the pavement containing the two reference marks for progressively generating electrical pixel video output data containing information of the condition of the pavement as the surface vehicle moves over the length of pavement;
   surface to pixel calibration means operatively connected to the output of the first video camera for electrically monitoring the apparent horizontal distance between the two reference marks as observed by the camera as the vehicle moves over the length of pavement to calibrate the pixel data with surface distances and for determining any vertical movement of the camera with respect to the horizontal data reference plane and to modify the electrical pixel video output data in response to such vertical movement of the camera to substantially eliminate data errors caused by vertical movement of the camera with respect to the pavement surface, such as vehicle bounce; and
   video signal processing operatively connected to the first video camera for electronically processing the electrical pixel video output data containing information of the condition of the length of pavement travelled by the surface vehicle.

12. In the pavement inspection apparatus as defined in claim 11 wherein the first video camera means includes video frame control means for repeatedly generating frames of electrical pixel output data corresponding to progressive fields of view of the camera of the pavement surface;
   and wherein the apparatus further comprises;
   velocity means associated with the vehicle for determining vehicle velocity; and
   data overlap removal means operatively connected to the output of the first video camera means and the velocity means for removing any redundant electrical pixel video output data that may appear in adjacent frames should the fields of view of the adjacent frames overlap.

13. In the pavement inspection apparatus as defined in claim 11 wherein the video signal processing means includes:
   video digitizing means operatively connected to the output of the first video camera and responsive to the electrical pixel output data for generating corresponding digital signal pixel data containing information of the condition of the length of pavement travelled by the surface vehicle;

random access memopry means for storing the digital signal pixel data;

distress detection means operatively connected to the memory means and responsive to the digital signal pixel data for detecting the presence of pavement surface distress features.

14. In the pavement inspection apparatus as defined in claim 13 further comprising:

distress feature classification means responsive to the detection of a defect for comparing the detected surface distress features with preset defect thresholds to determine the type and severity of the distress features and to classify the distress features in relationship to their type and severity for segments of the length of pavement containing distress features;

segment index means responsive to the classification of distress features for comparing the number of each type of distress feature and their severity with a selected number thresholds and for generating a pavement condition index representative of the general condition of each of the pavement segments;

recording means for recording the pavement condition index for each pavement segment over the length of the pavement travelled by the vehicle.

15. Pavement inspection apparatus for inspecting and determining the surface condition of a length of pavement, comprising:

a surface vehicle for moving over the length of the pavement in a longitudinal direction;

a first video camera mounted on the surface vehicle projecting toward the pavement surface having a first field of view of surface locations for generating a first set of frames of electrical pixel video output data representing reflected light intensities from longitudinally spaced surface locations as the vehicle moves over the length of the pavement;

a second video camera mounted on the surface vehicle and projecting toward the pavement surface at an acute angle with respect to the first video camera and having a second field of view of the same surface locations for generating a second set of frames of electrical pixel video output data representing reflected light intensities from the same longitudinally spaced array of surface locations, but from a different angle, as the surface vehicle moves over the length of the pavement;

electronic frame comparing means for comparing the electrical pixel output data of the first and second sets of frames to determine the vertical elevation of at least a portion of the surface locations; and electronic profile generating means operatively connected to the electronic frame comparing means for generating an electronic elevational profile of the length of the pavement.

16. The pavement inspection apparatus as defined in claim 15 further comprising:

vertical movement detection means responsive to vertical movement of the video cameras with respect to the pavement surface as the vehicle travels over the length of the pavement for adjusting the electrical pixel video output data to eliminate error caused by vertical movement of the video, cameras.

17. The pavement inspection apparatus as defined in claim 15 wherein the electronic profile means includes longitudinal profile means for generating a electronic longitudinal profile along the longitudinal length of pavement.

18. The pavement inspection apparatus as defined in claim 15 wherein the electronic profile means includes a rut profile means for generating electronic transverse profiles of the pavement surface at selected intervals along the length of the pavements to determine the degree of pavement rutting.

19. The pavement inspection apparatus as defined in claim 15 further comprising a recording means for recording electronic profile of the length of pavement.

20. The pavement inspection apparatus as defined in claim 15 wherein the electronic frame comparing means including (1) X-Y reference means for determining the same surface locations in the first and second set of frames, (2) spatial comparing means for determining spatial pixel distances between the same surface locations in the first and second set of frames and (3) elevational calculating means responsive to the determined spatial pixel distances and the acute angle between the first and second video cameras for calculating the vertical elevations of the surface locations.

21. The pavement inspection apparatus as defined in claim 15 wherein the vehicle has a width of 8 feet or less and wherein the first and second cameras each have a lateral field of view greater than 12 feet.

22. The pavement inspection apparatus as defined in claim 15 wherein the vehicle has a width of less than 8 feet and is capable of travelling along a paved road at normal traffic speeds and wherein the video cameras are capable of generating framese of unblurred electrical pixel video output data when the vehicle is moving at normal traffic speeds.

23. Pavement inspection apparatus for inspecting and determining distress features in a length of pavement comprising:

a surface vehicle for moving over the length of pavement in a longitudinal direction;

a first array video camera mounted on the surface vehicle projecting toward the pavement surface having a first field of view of a longitudinal and transverse X-Y array of surface locations for sequentially generating a first set of frames of electrical pixel video output data representing reflected light intensities from longitudinally spaced X-Y arrays of surface locations as the surface vehicle moves over the length of the pavement;

a second array video camera mounted on the surface vehicle projecting toward the pavement surface at an acute angle with respect to the first video camera and having a second field of view of the same longitudinal and transverse X-Y surface locations for sequentially generating a second set of frames of electrical pixel video output data representing reflected light intensities from the same longitudinally spaced X-Y arrays of surface locations, but from a different angle, as the surface vehicle moves over the length of the pavement;

electronic frame comparing means for comparing the electrical output data of the first and second set of frames of electrical output data to determine the vertical elevation of the surface locations;

electronic profile generating means operatively connected to the electronic frame comparing means for generating an electronic elevational profile of the length of the pavement; and surface distress means responsive to the electrical pixel video output data for determining the location and severity of surface distress features along the length of pavement.

24. The pavement inpsection apparatus as defined in claim 23 further comprising camera control means operatively connected to the first and second array video cameras for operating the cameras at camera shutter speeds and at frame frequencies sufficient to generate unblurred electrical pixel video output data when the vehicle is moving at normal traffic speeds such as 55 miles per hour.

25. The pavement inspection apparatus as defined in claim 23, further comprising:
vertical movement detection means responsive to vertical movement of the cameras with respect to the pavement surface as the vehicle travels over the length of pavement for adjusting electrical pixel video output data to eliminate error caused by vertical movement of the cameras.

26. The pavement inspection apparatus as defined in claim 25 wherein the vertical movement detection means includes:
a pair of electromagnetic beam generators mounted on the vehicle for directing two spaced electromagnetic reference beams on to the pavement surface within the fields of view of the cameras or forming two horizontally spaced reference marks;
measuring means responsive to the electrical pixel video output data for determining the location of the marks within the frames and for measuring the changes in apparent pixel distances between the two reference marks as the vehicle moves over the length of pavement to determine vertical movement of the cameras; and
data correcting means responsive to the determined movement of the cameras for correcting the electrical pixel video output data to remove error caused by vertical movement of the cameras.

27. A pavement inspection apparatus as defined in claim 23 wherein the surface distress means include:
defect detection means responsive to the electrical pixel video output data for detecting the presence of electrical pixel video output data that exceeds a preset gray-scale value to determine the existence and location of surface distress features;
boundary detection means responsive to the surface distress feature data for determining the size and shape of the surface distress feature;
severity classification means responsive to the size and shape of the surface distress features for comparing the size and shape of the distress features with preset values to determine the severity of the detected surface distress feature.

28. The pavement inspection apparatus as defined in claim 23 wherein the surface distress means includes condition index means responsive to the severity means for determining the condition of the length of the pavement.

29. The pavement inspection apparatus as defined in claim 23 wherein the boundary means include means for determining the length and width and orientation of the surface distress features; and
wherein the severity classification means is responsive to the length, width and orientation of the surface distress features to determine if the surface distress features are longitudinal cracks or transverse cracks.

30. The pavement inspection apparatus as defined in claim 23 wherein the surface distress means is responsive to the electronic frame comparing means and further includes distress feature elevation mean for determining the elevation of the surface distress feature to determine whether the surface distress features is a pothole.

31. Pavement inspection apparatus for determining the condition of a length of pavement, comprising:
a wheeled vehicle for moving over a length of the pavement in a longitudinal direction;
means on the wheeled vehicle for applying a preset vertical force through a wheel against the pavement to form a depression in the pavement beneath and extending rearward the wheel in a path travelled by the wheel as the vehicle is moved over the length of the pavement;
reference means on the vehicle for determining the undeflected elevation of the pavement along the wheel path;
a first wheel path video camera mounted on the vehicle having an X-Y field of view of the depression and extending rearward of the wheel for generating electrical video output data containing information of the deflected elevation of the depression at multiple sampling points in the X-Y field of view; and
deflection determining means operatively connected to the reference means and the first wheel path video camera and responsive to the electrical video output data for determining the deflection of the pavement in the X-Y field of view along wheel path as the vehicle moves over the pavement.

32. The pavement inspection apparatus as defined in claim 31 wherein the reference means includes:
a second wheel path video camera mounted on the wheeled vehicle having a field of view of an undeflected portion of the pavement in the wheel path for generating electrical video data containing information of the elevation of the undeflected pavement in the wheel path.

33. The pavement inspection apparatus as defined in claim 31 wherein the deflection determining means has means for calculating the inclination of the depression at each multiple sampling point and means for calculating the deflection of the pavement in the depression based upon the magnitudes of the inclinations at the multiple sampling points.

34. The pavement inspection apparatus as defined in claim 31, comprising:
means on the vehicle for determining the distance travelled by the vehicle; and
wherein the deflection determining means determines the deflection of the pavement in the wheel path at selected intervals and wherein the apparatus further comprises:
pavement condition means operatively connected to the deflection calculating means for accumulating the values of the deflection of the pavement at the selected intervals and determining the rate of change of the deflection of the pavement with respect to distance.

35. The pavement inspection apparatus as defined in claim 31 further comprising:
a first full view video camera mounted on the vehicle projecting toward the pavement having a lane width field of view of the pavement for sequentially generating a first set of frames of lane width electrical pixel data as the vehicle moves over the length of pavement, in which the lane width electrical pixel data contains information relating to surface distress features to the length of pavement; and surface distress means responsive to the lane width electrical pixel data for determining the location and severity of the surface distress features along the length of pavement.

36. The pavement inspection apparatus as defined in claim 35 further comprising:

a second full-width video camera mounted on the vehicle projecting toward the pavement at an acute angle with respect to the first full-width camera and having the same field of view for sequentially generating a second set of frames of lane width electrical pixel data as the vehicle moves over the length of the pavement, in which the second set of frames contain information concerning the elevational profile of the length of pavement; and electronic frame comparing means for comparing electrical pixel data of the first and second set of frames to determine the vertical elevation of the pavement; and electronic profile generating means operatively connected to electronic frame comparing means for generating an electronic representation of the elevational profile of the length of the pavement.

37. The pavement inspection apparatus as defined in claim 35 further comprising:

profile means operatively connected to the first full-width video camera for determining the elevational profile of the length of pavement as the vehicle moves over the pavement.

38. In a pavement inspection apparatus for inspecting and determining the presence and severity of surface distress features of a lane of pavement of a prescribed lane width, comprising:

a surface vehicle for moving over the lane of pavement in a longitudinal direction, in which the vehicle has a width less than the width of the lane;

distance means for measuring the lane distance travelled by the vehicle for generating location data;

a first video array camera means mounted on the surface vehicle projecting toward the pavement surface having a X-Y field of view of a full lane width of a longitudinal lane segment of the pavement for sequentially generating a first set of video frames of electrical pixel data representing a magnitude of reflected light from the lane surface as the surface vehicle moves in the lane over the length of pavement, in which the electrical pixel data contains information concerning the presence and severity of surface distress features; and surface distress detection means responsive to the electrical pixel data and the distance means for determining the presence, location and severity of the surface distress features in the lane along the length of the pavement.

39. In the pavement inspection apparatus as defined in claim 38 wherein the first set of video frames contains redundant electrical pixel data between adjacent frames in the longitudinal direction, and wherein the apparatus further comprises:

overlap means operatively connected to the distance means and responsive to the first set of frames for determining the degree of data overlap between adjacent frames.

40. In the pavement inspection apparatus as defined in claim 38 further comprising camera control means operatively connected to the first video array camera for operating the camera at a camera shutter speed and at a frame frequency sufficient to generating unblurred electrical pixel data when the data is moving at normal highway traffic speeds, such as 55 miles per hour.

41. In the pavement inspection apparatus as defined in claim 38 wherein the surface distress detection means includes:

defect detection means responsive to the electrical pixel data and the location data for comparing the electrical pixel data with a preset threshold grayscale value and generating distress feature electrical pixel data containing information concerning the size, shape and location of the surface distress features;

boundary detection means responsive to the distress feature electrical pixel data for determining the size and shape of the surface distress features;

severity classification means operatively connected to the boundary detection means for determining the size and shape of the distress features with respect to preset values to determine the severity of the surface defect features and to classify the features into categories according to the degree of severity of the distress feature.

42. In the pavement inspection apparatus as defined in claim 41 wherein the boundary detection means includes means for determining the length and width and orientation of the feature; and wherein the severity classification means is responsive to the length, width and orientation of the feature for determining if the distress feature is a longitudinal crack or a transverse crack.

43. In the pavement inspection apparatus as defined in claim 41 further comprising:

elevation detection means mounted on the vehicle for determining the elevation of one or more of the detected distress features to determine if the feature is a pothole.

44. In the pavement inspection apparatus as defined in claim 41 further comprising:

elevation detection means mounted on the vehicle for determining the elevation of selected surface locations of the lane at selected intervals along the length of the pavement;

electronic profile generating means operatively connected to the elevation detection means for generating an electrical elevational profile of the lane along the length of the pavement.

45. In a pavement inspection apparatus for determining the condition of a length of pavement and its subgrade, comprising:

a wheeled vehicle for moving over the length of pavement and thereby generating a depression in the pavement beneath a wheel the depth of which is indicative of the condition of the pavement subgrade;

a video array camera mounted on the surface vehicle projecting toward the pavement surface having a X-Y field of view of a segment of the pavement for sequentially generating a set of video frames of electrical pixel data representing a magnitude of reflected light from the pavement surface as the surface vehicle moves over the length of pavement, in which the electrical pixel data contains information of the presence and severity of surface distress features;

velocity means for determining the velocity of the vehicle as the vehicle moves over the length of pavement;

depth sensing means for sensing the depth of the wheel depression as the vehicle moves over the length of the pavement;

surface distress detection means responsive to the velocity means and the electrical pixel data for determining the presence, location and severity of the surface distress features along the length of the pavement; and profile detection means responsive to the velocity means and the electrical pixel data for determining the elevation profile of the pavement along its length.

46. The pavement inspection apparatus as defined in claim 45 further comprising:

vertical movement detection means responsive to the electrical pixel data for determining vertical movement of the video camera means relative to the pavement.

47. In the pavement inspection apparatus as defined in claim 45 further comprising:

surface to pixel calibration means responsive to the vehicle velocity and to the electrical pixel data for determining in real time a surface to pixel relationship.

* * * * *